(12) United States Patent
Matsuura et al.

(10) Patent No.: US 7,102,738 B2
(45) Date of Patent: Sep. 5, 2006

(54) METHOD AND APPARATUS FOR INSPECTING OPTICAL MODULES

(75) Inventors: Hiroyuki Matsuura, Tokyo (JP); Hiroshi Ichikawa, Tokyo (JP); Toshio Kimura, Tokyo (JP); Takeshi Aikiyo, Tokyo (JP); Masayoshi Seki, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 112 days.

(21) Appl. No.: 10/665,464

(22) Filed: Sep. 22, 2003

(65) Prior Publication Data
US 2004/0057039 A1    Mar. 25, 2004

Related U.S. Application Data

(63) Continuation of application No. PCT/JP02/06861, filed on Jul. 5, 2002.

(30) Foreign Application Priority Data

| Jul. 5, 2001 | (JP) | 2001-205220 |
|---|---|---|
| Aug. 28, 2001 | (JP) | 2001-257881 |
| Aug. 29, 2001 | (JP) | 2001-260022 |
| Aug. 30, 2001 | (JP) | 2001-261644 |

(51) Int. Cl.
*G01N 21/00*   (2006.01)

(52) U.S. Cl. .................................................. 356/73.1
(58) Field of Classification Search ................... None
See application file for complete search history.

(56) References Cited

U.S. PATENT DOCUMENTS 5,767,957 A * 6/1998 Barringer et al. .......... 356/73.1
6,290,588 B1 * 9/2001 Toyoda et al. .............. 451/384

FOREIGN PATENT DOCUMENTS

| JP | 63-43108 | 2/1988 |
|---|---|---|
| JP | 5-232328 | 9/1993 |
| JP | 6-307983 | 11/1994 |
| JP | 8-201223 | 8/1996 |
| JP | 8-278221 | 10/1996 |
| JP | 2001-41915 | 2/2001 |
| JP | 2001-83041 | 3/2001 |

* cited by examiner

*Primary Examiner*—Tu T. Nguyen
(74) *Attorney, Agent, or Firm*—Oblon, Spivak, McClelland, Maier & Neustadt, P.C.

(57) ABSTRACT

A method and apparatus for inspecting a plurality of optical modules, in which the optical modules are given channel numbers, a plurality of inspection items, which are related to optical characteristics and/or electrical characteristics of the optical modules, are measured in parallel, and measurement data on the inspection items is stored in storing device. This makes it possible to inspect the optical modules efficiently in a short time, eliminating waiting time.

8 Claims, 16 Drawing Sheets

FIG. 10

| | | | | | | | |
|---|---|---|---|---|---|---|---|
| PRODUCT DATA AREA | OPTICAL MODULE NUMBER | 1 | 2 | ... | 10 | 11 | ... |
| | INSPECTION BOARD NUMBER | 1 | 1 | ... | 1 | 2 | ... |
| | CHANNEL NUMBER | 1 | 2 | ... | 10 | 1 | ... |
| | OPERATOR IDENTIFICATION NUMBER | A | A | ... | A | B | ... |
| | ⋮ | ⋮ | ⋮ | ⋮ | ⋮ | ⋮ | ⋮ |
| MEASUREMENT CONDITION DATA AREA | CASE TEMPERATURE | ...°C | ... | ... | ... | ... | ... |
| | LD TEMPERATURE | ...°C | ... | ... | ... | ... | ... |
| | INSPECTION TYPE | INSPECTION 1 | INSPECTION 1 | ... | ... | ... | ... |
| | ⋮ | ⋮ | ⋮ | ⋮ | ⋮ | ⋮ | ⋮ |
| MEASUREMENT RESULT DATA AREA | I-L PLOT DATA BEFORE APPLICATION OF TEMPERATURE CYCLES | $I_1$  $L_1$ $I_2$  $L_2$ ...  ... | ... | ... | ... | ... | ... |
| | SECONDARY DATA | ... | ... | ... | ... | ... | ... |
| | ⋮ | ⋮ | ⋮ | ⋮ | ⋮ | ⋮ | ⋮ |

FIG. 11

| Area | Field | | | | | | |
|---|---|---|---|---|---|---|---|
| PRODUCT DATA AREA | OPTICAL MODULE NUMBER | 1 | 2 | ... | 10 | 11 | ... |
| | INSPECTION BOARD NUMBER | 1 | 1 | ... | 1 | 2 | ... |
| | CHANNEL NUMBER | 1 | 2 | ... | 10 | 1 | ... |
| | OPERATOR IDENTIFICATION NUMBER | A | A | ... | A | B | ... |
| | ⋮ | ⋮ | ⋮ | ⋮ | ⋮ | ⋮ | ⋮ |
| MEASUREMENT CONDITION DATA AREA | CASE TEMPERATURE | ...°C | ... | ... | ... | ... | ... |
| | LD TEMPERATURE | ...°C | ... | ... | ... | ... | ... |
| | INSPECTION TYPE | INSPECTION 2 | INSPECTION 2 | ... | ... | ... | ... |
| | PASS/FAIL CRITERION | ... | ... | ... | ... | ... | ... |
| | ⋮ | ⋮ | ⋮ | ⋮ | ⋮ | ⋮ | ⋮ |
| MEASUREMENT RESULT DATA AREA | I-L PLOT DATA AFTER APPLICATION OF TEMPERATURE CYCLES | $I_A$  $L_A$ $I_B$  $L_B$ ...  ... | | ... | ... | ... | ... |
| | SECONDARY DATA | ... | ... | ... | ... | ... | ... |
| | PASS/FAIL JUDGMENT | ○ | ... | ... | ... | ... | ... |
| | ⋮ | ⋮ | ⋮ | ⋮ | ⋮ | ⋮ | ⋮ |

FIG. 12

| | | | | | | | |
|---|---|---|---|---|---|---|---|
| PRODUCT DATA AREA | OPTICAL MODULE NUMBER | 1 | 2 | ... | 10 | 11 | ... |
| | INSPECTION BOARD NUMBER | 1 | 1 | ... | 1 | 2 | ... |
| | CHANNEL NUMBER | 1 | 2 | ... | 10 | 1 | ... |
| | OPERATOR IDENTIFICATION NUMBER | A | A | ... | A | B | ... |
| | ... | ... | ... | ... | ... | ... | ... |
| MEASUREMENT CONDITION DATA AREA | CASE TEMPERATURE | ...°C | ... | ... | ... | ... | ... |
| | LD TEMPERATURE | ...°C | ... | ... | ... | ... | ... |
| | ... | ... | ... | ... | ... | ... | ... |
| MEASUREMENT RESULT DATA AREA | I–L PLOT DATA BEFORE APPLICATION OF TEMPERATURE CYCLES | $I_1$ $I_2$ ... | $L_1$ $L_2$ ... | ... | ... | ... | ... |
| | I–L PLOT DATA AFTER APPLICATION OF TEMPERATURE CYCLES | $I_A$ $I_B$ ... | $L_A$ $L_B$ ... | ... | ... | ... | ... |
| | SECONDARY DATA | ... | ... | ... | ... | ... | ... |
| | PASS/FAIL JUDGMENT | ○ | ... | ... | ... | ... | ... |
| | ... | ... | ... | ... | ... | ... | ... |

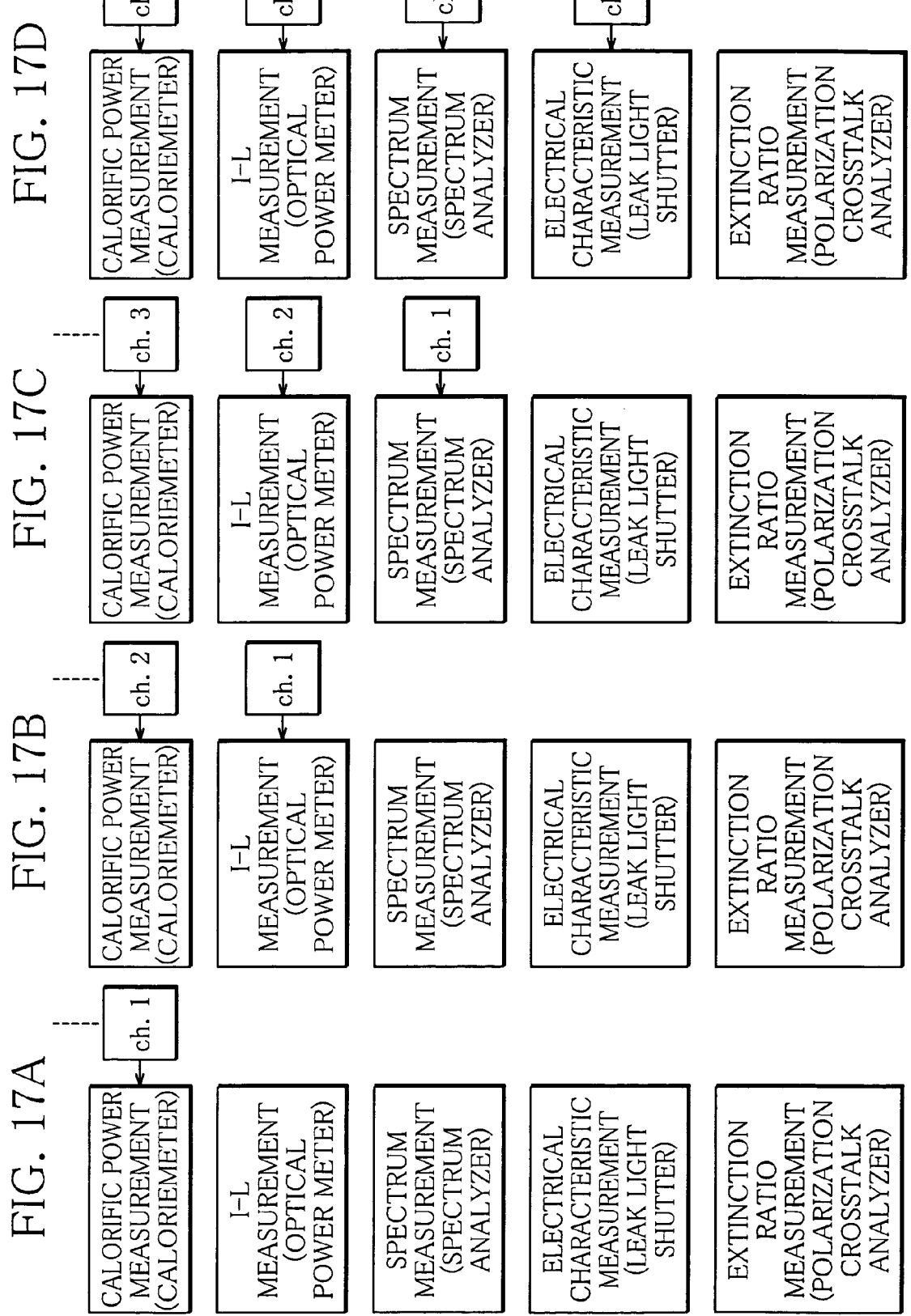

FIG. 19

| | | | | |
|---|---|---|---|---|
| PRODUCT DATA AREA | OPTICAL MODULE NUMBER | 1 | 2 | ... |
| | CHANNEL NUMBER | 1 | 2 | ... |
| | OPERATOR IDENTIFICATION NUMBER | ... | ... | ... |
| | ⋮ | ⋮ | ⋮ | ⋮ |
| MEASUREMENT CONDITION DATA AREA | CASE TEMPERATURE | ... °C | ... | ... |
| | LD TEMPERATURE | ... °C | ... | ... |
| | PASS/FAIL CRITERION | ... | ... | ... |
| | ⋮ | ⋮ | ⋮ | ⋮ |
| MEASUREMENT RESULT DATA AREA | I-L PLOT DATA | $I_A$ $L_A$ / $I_B$ $L_B$ / ... ... | ... | ... |
| | SPECTRUM PLOT DATA | $\lambda_A$ $L_A$ / $\lambda_B$ $L_B$ / ... ... | ... | ... |
| | ELECTRICAL CHARACTERISTIC DATA | ... | ... | ... |
| | EXTINCTION RATIO | ... | ... | ... |
| | SECONDARY DATA | ... | ... | ... |
| | PASS/FAIL JUDGMENT | ... | ... | ... |
| | ⋮ | ⋮ | ⋮ | ⋮ |

METHOD AND APPARATUS FOR INSPECTING OPTICAL MODULES

CROSS REFERENCE TO RELATED APPLICATION

This is a Continuation Application of PCT Application No. PCT/JP02/06861, filed on Jul. 5, 2002, which was not published under PCT Article 21(2) in English. This application is based upon and claims the benefit of priority from the prior Japanese Patent Application Nos. 2001-205220, filed Jul. 5, 2001, 2001-257881, filed Aug. 28, 2001, 2001-260022, filed Aug. 29, 2001, and 2001-261644, filed Aug. 30, 2001, the entire contents of which are incorporated herein by reference.

TECHNICAL FIELD

The present invention relates to a method and apparatus for inspecting optical modules.

BACKGROUND ART

Optical modules such as semiconductor laser (LD) modules having a semiconductor laser fitted at an end of an optical fiber are subjected to screening (judgment on pass or fail) after they are manufactured, the screening including tests such as temperature cycling test, burn-in test, etc., and those which fail to meet a predetermined criterion are removed while those which meet the criterion are shipped as final products.

Conventionally, characteristics of a semiconductor laser (hereinafter referred to as "LD") included in an optical module, such as an optical output (L) as a function of operating current (I) (hereinafter referred to simply as "I-L characteristic"), an operating voltage (V), an monitor current (Im), etc. are evaluated, for example, in the following manner:

Optical modules are fitted to an inspection apparatus one by one. The above-mentioned characteristics of the optical modules are measured, and then the optical modules are detached from the inspection apparatus. Then, temperature cycles are applied to the optical modules in an environmental chamber, thereafter the optical modules are taken out of the environmental chamber, fitted again to the inspection apparatus one by one, and the characteristics of the optical modules are measured.

And based on the measurement results of the characteristics of the optical modules obtained before and after the application of temperature cycles, the rate of change in each characteristic is evaluated. Thus, conventionally, optical modules had to be fitted to and detached from the inspection apparatus each time they are tested, and hence, it is cumbersome to inspect a large number of optical modules.

Further, in the above-described method of inspecting optical modules, since each optical module needs to have its measured data recorded with one-to-one correspondence between the measured data obtained before and after application of temperature cycles on each measurement item, there is a problem that the larger the number of optical modules, the more cumbersome data management becomes.

In this way, inspecting a large number of optical modules requires not only a long tact time for inspection or screening but also cumbersome works to be done of data-processing and of screening on the basis of the processed data.

Thus, there is a demand for an efficient inspection method and an apparatus, capable of simultaneously inspecting a plurality of optical modules in a short time.

Further, in simultaneously inspecting a plurality of optical modules, there also was a problematic factor diminishing efficiency of the inspection, that redundant-length portions of optical fibers extending from the plurality of optical modules got tangled and hindered the inspection.

DISCLOSURE OF THE INVENTION

The present invention is intended to solve the above problems. The object of the present invention is to provide a method and apparatus for inspecting optical modules capable of efficiently inspecting a plurality of optical modules in a short time, eliminating waiting time wasted on fitting and detaching optical modules and cumbersome data management.

In order to achieve the above object, the present invention provides a method of inspecting a plurality of optical modules each having an optical fiber, for at least one of their optical characteristics and electrical characteristics, comprising: a first step of detachably fitting the plurality of optical modules to a plurality of fitting blocks of a single inspection board, each of the fitting blocks having a specific channel-number corresponding to a fitting position on the single inspection board; a second step of setting the inspection board on a first inspection apparatus; and a third step of measuring at least one of the optical characteristics and electrical characteristics of each of the plurality of optical modules by the first inspection apparatus in a state that the optical modules are fitted to the inspection board, and storing the obtained measurement data in one of storage areas allocated to the specific channel number.

In this method, a plurality of optical modules are individually fitted to the fitting blocks on the single inspection board, where each of the fitting blocks is given channel number corresponding to the fitting position. In this state, measurement of optical characteristics and/or electrical characteristics is performed, and measurement data obtained for each of the optical modules is stored in one of the storage areas allocated to the channel number. Thus, the optical modules are related to the channels of the inspection board one to one, which enables an unitary management of the measurement data obtained.

The method can further comprise a fourth step of removing the inspection board from the first inspection apparatus; a fifth step of setting the inspection board on a second inspection apparatus without detaching the optical modules from the inspection board; and a sixth step of measuring at least one of the optical characteristics and electrical characteristics of each of the optical modules fitted to the inspection board by the second inspection apparatus, and storing the obtained measurement data in one of storage areas allocated to the specific channel number.

Here, the first and second inspection apparatuses can be either the same or separate.

In this invention, the plurality of optical modules are individually fitted to the fitting blocks on the single inspection board, where each of the fitting blocks is given channel number corresponding to the fitting position. In this state, measurement of optical characteristics and/or electrical characteristics is performed in more than one step (third and sixth steps) without a step of detaching the optical modules from the inspection board, and the measurement data obtained are stored in the storage areas allocated to the specific channel numbers. Thus, it is possible not only to eliminate the need to fit and detach optical modules each time they are measured for one item, but also to relate each of the optical modules to the corresponding channel on the inspection board, thereby to unitarily manage the measurement data obtained.

Preferably, the method further comprises a seventh step of performing a predetermined operation on the measurement data obtained in the third step, and storing the results of the operation in the storage areas allocated to the specific channel number.

Still preferably, the method further comprises an eighth step of performing a predetermined operation on the measurement data obtained in the sixth step, and storing the results of the operation in the storage areas allocated to the specific channel number.

Here, the term operation may include not only calculation based on predetermined numerical expressions, but also logical operation such as a decision about whether or not an optical module is acceptable on the basis of comparison with a predetermined criterion.

In these cases, highly functional inspection can be performed using the unitarily managed data structure.

Still preferably, the method further comprises a ninth step, performed between the fourth and the fifth steps, of applying a stress to the inspection board in the state that the optical modules are fitted to the inspection board.

Preferably, the method further comprises a tenth step of performing a predetermined operation between the measurement data obtained in the third step and the measurement data obtained in the sixth step, and storing the result of the operation in the storage areas allocated to the specific channel number.

In the above method, the stress may be temperature cycles.

In these cases, since a stress such as temperature cycles or feeding of current is applied to optical modules in the state that the optical modules are fitted to the inspection board, the screening of optical modules suffered the stress can be carried out efficiently.

Preferably, an optical connector having a light emitting end face is attached to one end of each of the plurality of optical fibers, a plurality of the optical connector being fitted to the inspection board and arranged in one direction with the light emitting end faces thereof being exposed, and the third step may include intermittently moving a stage having a measuring head suitable for the measurement item in the one direction of arrangement of the optical connectors to face the light emitting end faces of the optical connectors, and performing measurement of the optical characteristics.

Still preferably, an optical connector having a light emitting end face is attached to one end of each of the plurality of optical fibers, a plurality of the optical connector being fitted to the inspection board and arranged in one direction with the light emitting end faces thereof being exposed, and the sixth step may include intermittently moving a stage having a measuring head suitable for the measurement item in the one direction of arrangement of the optical connectors to face the light emitting end faces of the optical connectors, and performing measurement of the optical characteristics.

In these cases, since the plurality of optical connectors of optical modules are fitted to the inspection board and arranged in one direction, and since the measurement of an optical characteristic is performed by intermittently moving the stage having the measuring head suitable for the measurement item in the one direction of arrangement of the optical connectors, the measurement can be performed very efficiently.

Further, the third step may include intermittently moving a stage having measuring heads suitable for M kinds of inspection items arranged in the same direction as the row direction of the optical connectors, and simultaneously performing measurements of the M kinds of inspection items in parallel on a plurality of the optical module corresponding to the mutually distinct M channel-numbers.

Still further, the sixth step may include intermittently moving a stage having measuring heads suitable for M kinds of inspection items arranged in the same direction as the row direction of the optical connectors, and simultaneously performing measurements of the M kinds of inspection items in parallel on a plurality of the optical module corresponding to the mutually distinct M channel numbers.

In these cases, measurements of different kinds of item are performed in parallel on a plurality of the optical module fitted to the inspection board, and the measurement data obtained on those different items are stored in storage areas allocated to the corresponding channel numbers. Thus, it is possible to eliminate the time wasted on waiting for one optical module being finished with all kinds of measurements before starting measurements on another optical module. Further, the above method enables an unitary management of the measurement data, whereby the throughput of optical module inspection can be improved to a great degree.

The present invention also provides an inspection board for use in inspecting a plurality of optical modules each having an optical fiber, for at least one of their optical characteristics and electrical characteristics, comprising: a main body; a fitting part located on a principal surface of the main body for detachably fitting the plurality of optical modules; a redundant-length handling part located on the principal surface of the main body for preventing redundant-length portions of a plurality of optical fibers of the optical modules from being tangled; and an array part located on the main body for arranging optical connectors in one direction, each connector being attached to an end of each of the plurality of optical modules, such that light emitting end faces of the optical connectors are exposed.

In this inspection board, optical modules are fitted in a state that the redundant-length portions of optical fibers are orderly arranged and the optical connectors attached to the ends thereof are arranged in a row, allowing easy and safe handling of optical fibers and thereby improving the inspection efficiency.

Preferably, the redundant-length handling part includes a plurality of catching members set up on the main body for individually coiling the redundant-length portions of the optical fibers thereabout.

In this case, the redundant-length portions of optical fibers are coiled around the catching members. Thus, the redundant-length portions of the optical fibers are caught stably and prevented from being tangled, which permits easier handling of optical fibers.

Still preferably, the redundant-length handling part includes a partition plate having openings through which an upper portion of each of the catching members projects.

In this case, the redundant-length portions of optical fibers are covered with the partition plate, with the upper portion of each of the catching members projecting through the openings of the partition plate. Thus, the redundant-length portions of optical fibers are always caught surely around the catching members under the partition plate, whichever orientation the inspection board may take when being carried in the state that the optical modules are fitted to the inspection board. Thus, the redundant-length portions of the optical fibers are surely prevented from getting tangled, spreading beyond the redundant-length handling part, touching other objects and getting broken or scratched.

Still preferably, the partition plate comprises a flat portion to be faced approximately in parallel to the principal surface of the main body, and a guide portion bent in substantially a semicircular shape in cross section extending continuously from an end of the flat portion adjacent to the fitting part, where the above-mentioned openings are formed in the flat portion.

In this case, since the partition plate comprises the flat portion to be faced approximately parallel to the principal surface of the main body and the guide portion bent in substantially a semicircular shape in cross section extending continuously from the end of the flat portion adjacent to the fitting part, the redundant-length portions of optical fibers are always caught surely around the catching members under the flat portion of the partition plate, and those portions of the optical fibers which are drawn from the redundant-length handling part toward the fitting part are prevented from being scratched or broken by touching a sharp edge of the partition plate. Thus, the optical fibers can be safely guided from under the partition plate, along the outside of the bent portion, to the array part which is provided at a level equal to or higher than the upper face of the partition plate.

Still preferably, the redundant-length handling part includes a cover for covering the catching members and the partition plate.

In this case, since the partition plate and the catching members are covered with the cover, those portions of optical fibers which are located over the upper face of the partition plate are protected from breaking or being scratched by touching external objects.

Furthermore, in the inspection board of the present invention, the fitting part includes a plurality of fitting blocks for individually and detachably fitting the plurality of optical modules, where the fitting blocks are arranged in a plurality of rows parallel to the array part such that ones in adjacent rows are staggered in position.

Preferably, the fitting blocks in the row farther from the array part are configured to fit the optical modules at an equal level to or a higher level than the fitting blocks in the rows closer to the array part.

In this case, it is possible to handle the optical fibers more easily and to fit the optical modules more densely to the fitting part.

Further, in the inspection board of the present invention, the fitting part may include a plurality of fitting blocks each having a first opening for fitting one of the optical modules, and the main body may have a plurality of second openings each corresponding to each of the plurality of fitting blocks and piercing from the principal surface of the main body to the under surface thereof, where the fitting blocks may be fitted to the fitting part such that the first openings in the fitting blocks and the second openings in the main body are connected one to one.

In this case, a cooling device including a heat sink, an external Peltier module, etc. can be brought in contact with the bottom face of each optical module through the first opening in the fitting block and the second opening in the main body connected to the first opening, enabling measurement of various characteristics to be carried out in the state that the case temperature of each optical module is kept as desired.

Preferably, each fitting block has positioning portions, formed near the first opening, for fitting a plurality of lead pins of one of the optical modules thereon and thereby placing the optical module in right position, and through holes are formed in the positioning portions and the main body, the through holes continuously extending between the fitting block and the main body.

In this case, it is possible to place an optical module in right position with the help of the positioning portions of the fitting block, and it is further possible to insert contact probes into the through holes each located at a part of the positioning portions and passing through each of the fitting block and the main body, thereby to establish electrical connection between the optical module and an inspection apparatus from outside.

The present invention also provides an optical module inspection apparatus, the apparatus comprising:

an inspection board for detachably fitting a plurality of optical modules each having an optical fiber extending therefrom, such that end faces of the optical fibers are exposed and arranged in one direction;

a measurement part for measuring at least one of optical characteristics of an optical signal emitted from the end face of the optical fiber of each of the optical modules and electrical characteristics of each of the optical modules;

a driving part for driving each of the optical modules to emit the optical signal from the end face of the optical fiber;

a temperature control part for controlling the temperature of each of the optical modules; and a control part for controlling the measurement part, the driving part and the temperature control part, wherein the control part allocates storage areas to specific channel numbers given to the optical modules in accordance with the fitting positions on the inspection board, takes in measurement data from the measurement part and/or performs operation on the measurement data, and stores the measurement data and/or results of the operation in the storage areas.

Here, the term operation includes not only calculation based on predetermined numerical expressions, but also logical operation such as a decision about whether or not an optical module is acceptable on the basis of comparison with a predetermined criterion.

In this apparatus, the storage areas are allocated to the channel numbers given to optical modules in accordance with the fitting positions on the inspection board, and measurement data and results of operation are stored in the storage areas. Thus, it is possible to manage characteristic data obtained from the plurality of optical modules in an unitary and highly functional manner.

Preferably, the measurement part includes a stage supporting a measuring head suitable for a measurement item and capable of intermittently moving the measuring head to face the end face of each of the optical fibers in accordance with a signal from the control part, and the control part drives the optical module positioned correspondingly to the measuring head supported by the stage.

In this case, the control part moves the measuring head suitable for the measurement item to intermittently face the end face of the optical fiber of the optical module to be measured on, and drives the optical module positioned correspondingly to the measuring head supported by the stage. Thus, measurement can be efficiently performed on the plurality of optical modules fitted to the inspection board.

The stage may support a plurality of measuring heads as many as a plurality of measurement items such that the plurality of measuring heads are arranged in the same direction as the optical fibers arranged on the inspection board, and the control part may drive a plurality of the optical module positioned correspondingly to the plurality of measuring heads supported by the stage.

In this case, measurements of different kinds of item are performed in parallel on the plurality of the optical module fitted to the inspection board, and the measurement data obtained on those different items are stored in storage areas allocated to the corresponding channel numbers. Thus, it is possible to eliminate the time wasted on waiting for one optical module being finished with all kinds of measurements before starting measurements on another optical module. Further, the optical module inspection apparatus enables an unitary management of the measurement data obtained for the plurality of measurement items on every optical module with corresponding channel-number, whereby the throughput of inspection performed on a large number of optical modules can be improved to a great degree.

Preferably, the optical module inspection apparatus may further comprise a temperature cycling chamber for applying temperature cycles to the optical modules in the state that the optical modules are fitted to the inspection board, and the control part may perform predetermined operation on data of at least one of optical and electrical characteristics of the optical modules obtained before and/or after application of temperature cycles.

Here, the term operation includes not only calculation based on predetermined numerical expressions, but also logical operation such as a decision about whether or not an optical module is acceptable on the basis of comparison with a predetermined criterion.

In this case, the screening of optical modules suffered the temperature cycling can be carried out efficiently.

Still preferably, the control part may allocate a storage region to each of identification numbers of the inspection boards, in which the control part further allocates a storage area to each of the channel numbers, the storage area storing the measurement data and/or the results of operation.

In this case, since the storage regions are allocated to each of the identification numbers of the inspection boards, it is possible to unitarily and efficiently manage the measurement data obtained on a large number of optical modules fitted to a large number of inspection boards.

The present invention also provides a method of arranging redundant-length portions of optical fibers extending from a plurality of optical modules fitted to a board, the method comprising: a step of individually coiling the redundant-length portions of the optical fibers around a plurality of catching members arranged on the board; and a step of laying a cover over the catching members to individually keep the redundant-length portions of the optical fibers.

In this method, the redundant-length portions of optical fibers can be handled safely with no tangle occurring, which is helpful in improving the inspection efficiency.

BRIEF DESCRIPTION OF THE DRAWINGS

FIGS. 8A and 8B show the second inspection board of FIG. 6 with optical modules set thereon, of which FIG. 8A is a plan view, while FIG. 8B is a lateral cross-sectional view;

FIG. 10 is a diagram showing an example of a data structure of stored data (before application of temperature cycles) adopted in the first embodiment of the inspection method according to the present invention;

FIG. 11 is a diagram showing another example of a data structure of stored data (after application of temperature cycles) adopted in the first embodiment of the inspection method according to the present invention;

FIG. 12 is a diagram showing still another example of a data structure of stored data adopted in the first embodiment of the inspection method according to the present invention;

FIGS. 16A and 16B are cross-sectional views showing a measurement part shown in FIG. 15, of which FIG. 16A shows a cross section across a heat sink, an external Peltier module and a cooler, while FIG. 16B shows a cross section across leads of an optical module and contact probes;

FIGS. 17A to 17D are flowcharts showing flows of inspection in the second embodiment;

FIG. 19 is a diagram showing an example of a data structure of stored data adopted in the second embodiment.

BEST MODE OF CARRYING OUT THE INVENTION

A method of inspecting optical modules according to the present invention will be described in detail below.

First, inspection boards 20, 30 used in the method of inspecting optical modules according to the present invention will be described.

A first inspection board 20, to which a plurality of optical modules are fitted detachably, is used to carry out the first inspection described later.

Figure 1:
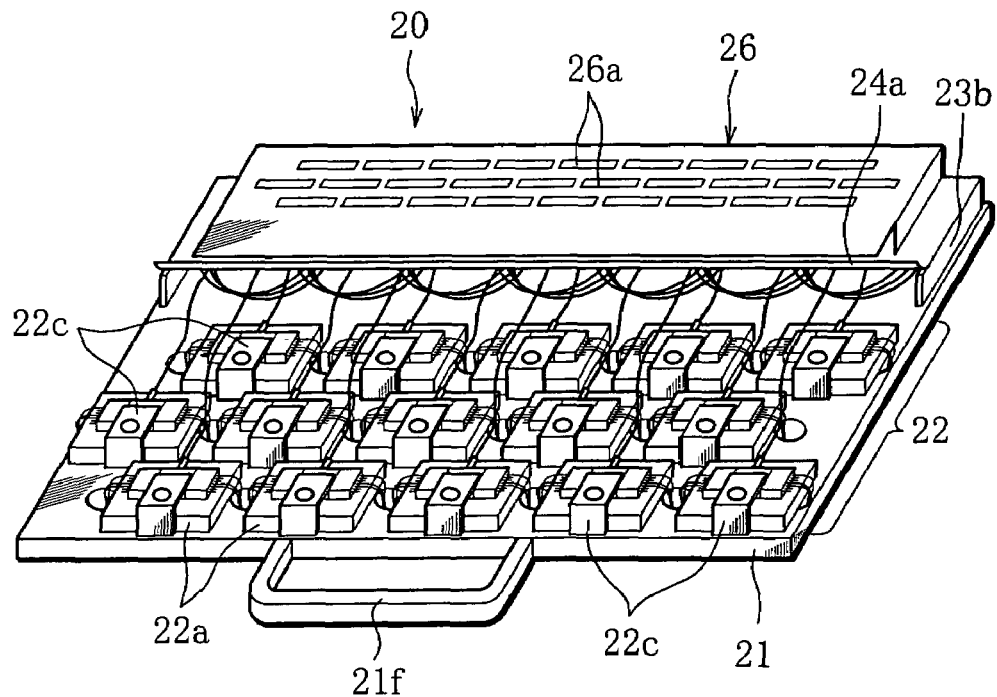
FIG. 1 is a perspective view of a first inspection board, which is a first embodiment of an inspection board according to the present invention.
Figure 2:
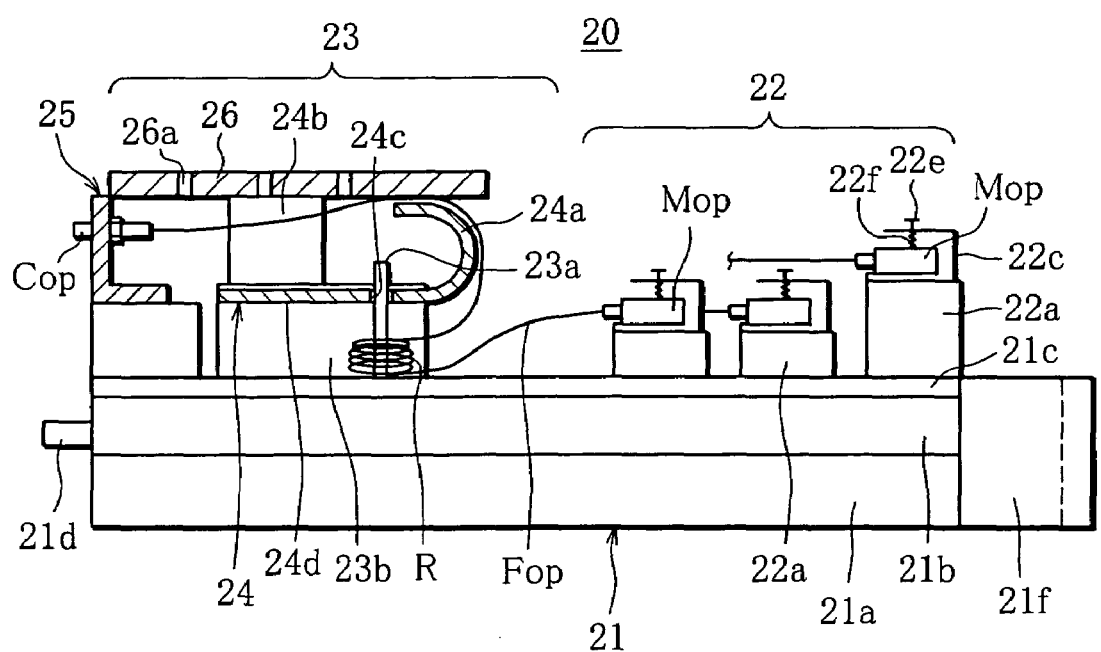
FIG. 2 is a sectional side view of the inspection board of FIG. 1.

As shown in FIGS. 1 and 2, the first inspection board 20 comprises a main body 21, a fitting part 22, a redundant-length handling part 23, an array plate 25 and an electrical connector 21$d$.

The main body 21 includes a quadrangular metal frame 21$a$, on which a circuit board 21$b$ and an insulating board 21$c$ are fitted. Printed circuits for electrically connecting a plurality of optical modules Mop and the electrical connector 21$d$ are formed on both the upper and lower faces of the circuit board 21$b$ of the main body 21. The electrical connector 21$d$ projects from a side adjacent the redundant-length handling part 23.

Figure 3:
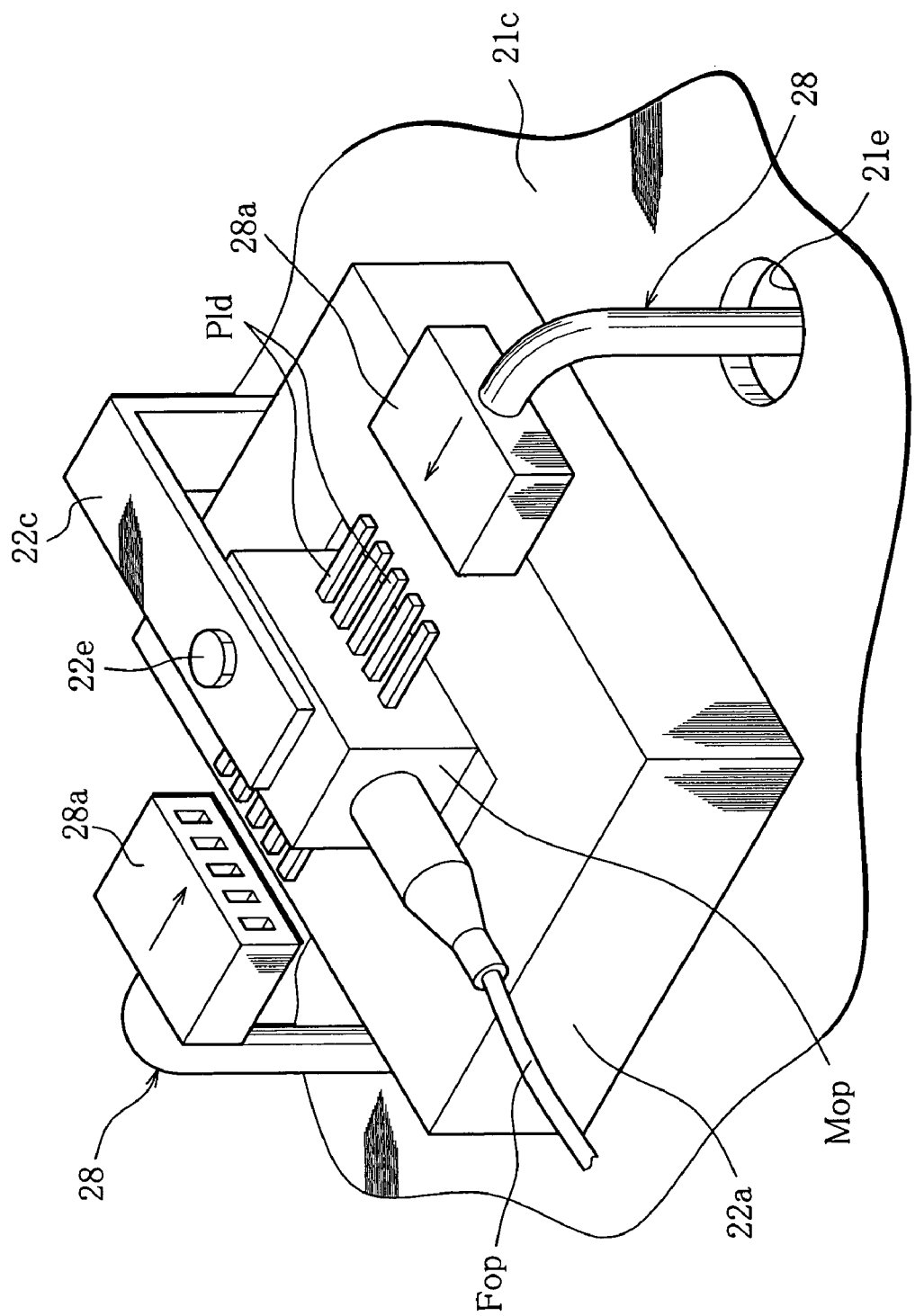
FIG. 3 is a perspective view showing the inspection board of FIG. 1 with optical modules set thereon.

As shown in FIG. 3, openings 21e are formed on both sides of each of a plurality of fitting blocks 22a, and wiring cables 28 come out through the openings 21e. Further, as shown in FIG. 1, a handle 21f is provided on a side adjacent the fitting part 22.

Each wiring cable 28 has a connector 28a attached to its one end, while the other end thereof is connected to the printed circuit (not shown) formed on the lower face of the circuit board 21b. Each connector 28a is connected to a plurality of lead pins Pld of an optical module Mop fitted to the fitting block 22a, whereby electrical connection may be established between the optical module Mop and an inspection apparatus I (described later) through the electrical connector 21d.

It is through this electrical connection that the inspection board 20 controls the temperature and the driving current of an LD, a Peltier module, a thermistor, etc., all of which are included in each of the optical modules Mop fitted to the fitting block 22a, and exchanges the signals indicative of operating states (such as of driving-voltage or driving-current) of these elements between the inspection board 20 and the inspection apparatus I.

The fitting part 22 comprises a plurality of the fitting blocks 22a, to which optical modules Mop are detachably fitted by means of fitting members 22c. Each fitting block 22a is given a channel number for identification. Each fitting block 22a also functions as a heat sink for the optical module Mop.

For the purpose of increasing a fitting density of the optical modules Mop, in the first inspection board 20 of the present embodiment, fitting blocks 22a are arranged in three rows each comprising five fitting blocks 22a, such that ones in adjacent rows are staggered in position by half a pitch, as shown in FIG. 1.

Further, as shown in FIG. 2, the fitting blocks 22a in the remotest row from the redundant-length handling part 23, that is, in the row adjacent the handle 21f, are so formed that optical modules Mop are fitted at a higher level, as compared with the fitting blocks 22a in the other two rows. Such an arrangement of fitting blocks 22a makes the handling of optical fibers Fop easier and is helpful in increasing a fitting density of optical modules Mop.

In FIGS. 2 and 3, a fitting member 22c is an L-shaped plate attached to each of the fitting blocks 22a with a hinge, and it is so designed that an optical module Mop may be detachably pressed against the fitting block 22a by a screw 22e. A spring 22f for adjusting the pressing force is arranged between the fitting member 22c and the fitting block 22a.

Figure 4:
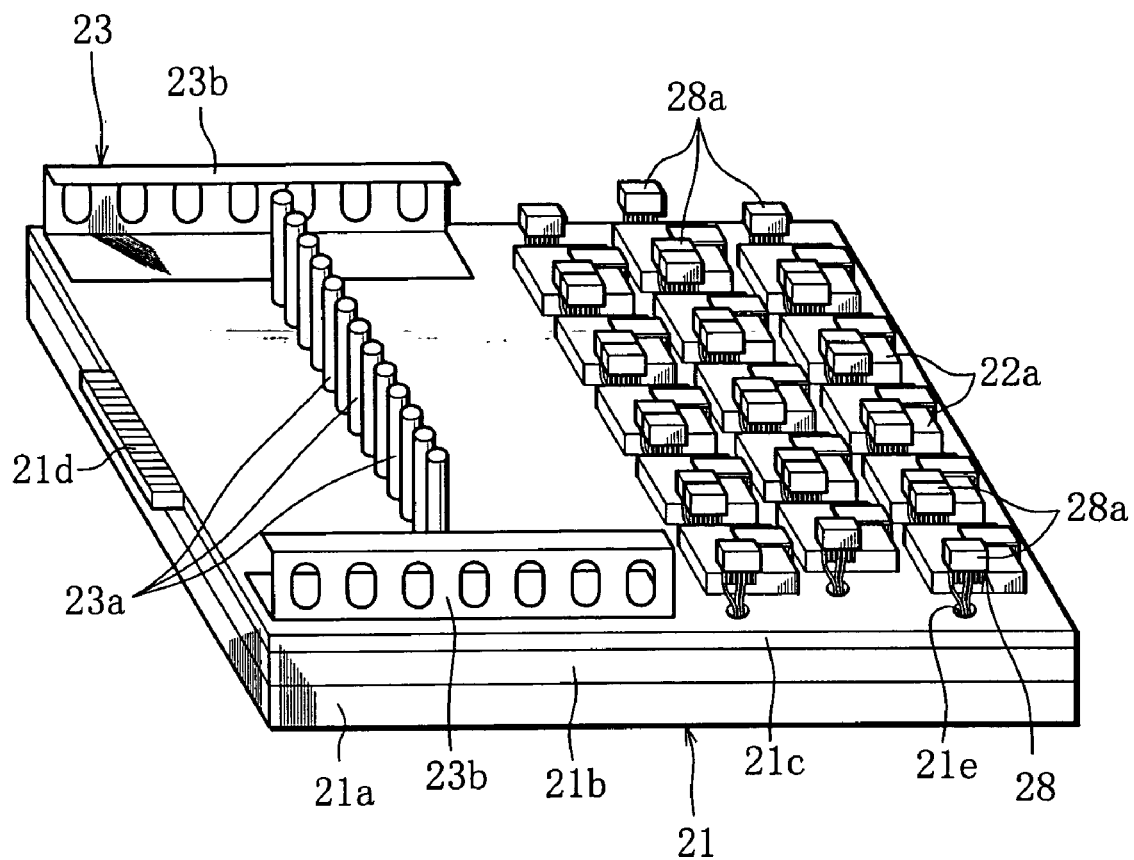
FIG. 4 is a perspective view of the inspection board of FIG. 1 as viewed from a side-face side.

The redundant-length handling part 23 is provided next to the fitting part 22 in an extending direction of optical fibers Fop from optical modules Mop, and comprises a plurality of pins (catching members) 23a set up on the main body 21 and arranged in rows parallel to the rows of fitting blocks 22a, and support plates 23b provided on both lateral sides thereof, as shown in FIG. 4.

The pins 23a are used to catch coiled portions R of redundant-length portions of optical fibers Fop extending from optical modules Mop (see FIG. 2) to thereby prevent the optical fibers Fop from being tangled and to facilitate the handling of the optical fibers. On the support plates 23b on both lateral sides, a partition plate 24 is arranged as shown in FIG. 2.

The partition plate 24 comprises a flat portion 24d to cover over the coiled portions R of optical fibers Fop and a guide portion 24a formed in a semicircular shape extending continuously from an end of the flat portion 24d adjacent the fitting part 22. Such an partition plate 24 being provided, optical fibers Fop extending from optical modules Mop are once drawn back from the coiled portions R toward the optical modules Mop, then guided from under the partition plate 24 along the outside of the guide portion 24a to over the partition plate 24, and then brought forth again in the direction in which they extend from the optical modules Mop.

Therefore, the optical fibers Fop are prevented from being scratched or broken by touching a sharp edge of the partition plate 24.

Further, a support plates 24b is provided on each lateral side of the partition plate 24, as shown in FIG. 2, and openings 24c are formed through the flat portion 24d so that the upper portions of the pins 23a may project through the openings 24c.

Since the coiled portion R of the redundant-length portion of each optical fiber Fop is caught around the pin (catching member) 23a and covered over with the flat portion 24d of the partition plate 24, with the upper portion of the pin 23a projecting through the opening 24c beyond the upper face of the flat portion 24d, the redundant-length portions of optical fibers Fop are surely caught around the pins 23a between the main body 21 and the partition plate 24, whichever orientation the first inspection board 20 may take when it is grasped by its handle 21f and carried. Thus, the optical fibers Fop are prevented from getting tangled, and the redundant-length portions of the optical fibers Fop are prevented from spreading beyond the redundant-length handling part, touching other objects and getting broken or scratched.

Figure 5:
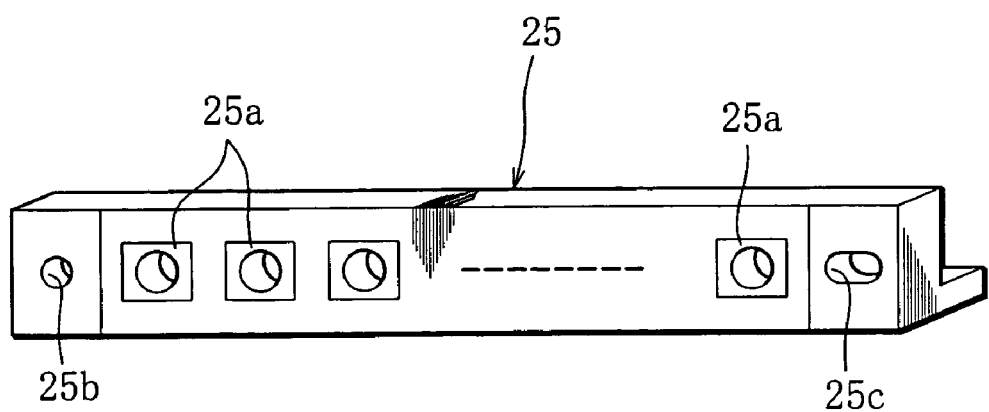
FIG. 5 is a perspective view showing an array plate with adapters, which is included in the first inspection board of FIG. 1.

As shown in FIG. 2, the array plate 25 is fixed to the main body 21, adjacent to the partition plate 24. The array plate 25 is a member made of a longitudinal plate to be arranged in widthwise direction of the first inspection board 20 (i.e., in the arrangement direction of the fitting blocks 22a in each row), and is fitted with a plurality of adapters 25a arranged at predetermined intervals in the longitudinal direction, as shown in FIG. 5. Each of the adapters 25a is given a number (a channel number) for identification, corresponding to each fitting block 22a. An optical connector Cop (see FIGS. 2 and 9) attached to each end of the optical fibers Fop of the optical modules Mop is detachably fitted to one of the adapters 25a. Thus, the optical connectors Cop are arranged in a row at predetermined intervals, with their emission end faces exposed on the rear face of the array plate 25 (i.e., on the outer surface of the first inspection board).

Further, as shown in FIG. 5, the array plate 25 has a round hole 25b at one end and an elongated hole 25c slightly longer in the longitudinal direction of the array plate 25 than the round hole 25b at the other end. As will be described later, when the first inspection board 20 is set on a board table 2a of the inspection apparatus I, positioning pins (not shown) provided on a rear side of the board table 2a fit into the holes 25b, 25c, whereby the first inspection board 20 is set in right position relative to the inspection apparatus I.

In addition, as shown in FIG. 2, a cover 26 is arranged over the partition plate 24, using the two support plates 24b, so that those portions of optical fibers located over the upper face of the partition plate 24 may be kept inside the redundant-length handling part 23. Since the optical fibers Fop drawn out to over the partition plate 24a around the outside of the guide portion 24a are protected this way, it is possible to prevent accidents such as a breaking or scratching of the optical fibers Fop by touching external objects, that might occur while the first inspection board 20 is being carried. As shown in FIG. 1, an appropriate number of holes 26a are formed through the cover 26 so that heat may become uniform quickly inside and outside the redundant-length handling part 23 during the application of temperature cycles which will be described later. Note that holes are similarly formed through the partition plate 24 as well.

A second inspection board 30, to which a plurality of optical modules are fitted detachably, is used to carry out the second inspection described later.

The second inspection board 30 is simpler in structure than the first inspection board 20 because it does not have the partition plate 24 or the cover 26 unlike the first inspection board 20. However, the second inspection board 30 has some similar features to the first inspection board 20. Thus, the component members and parts of the second inspection board 30 which are similar to those of the first inspection board 20 will be referred to by the same names and corresponding reference numerals, and duplicate explanation thereof will be omitted. Explanation will be made below mainly of differences therebetween.

Figure 6:
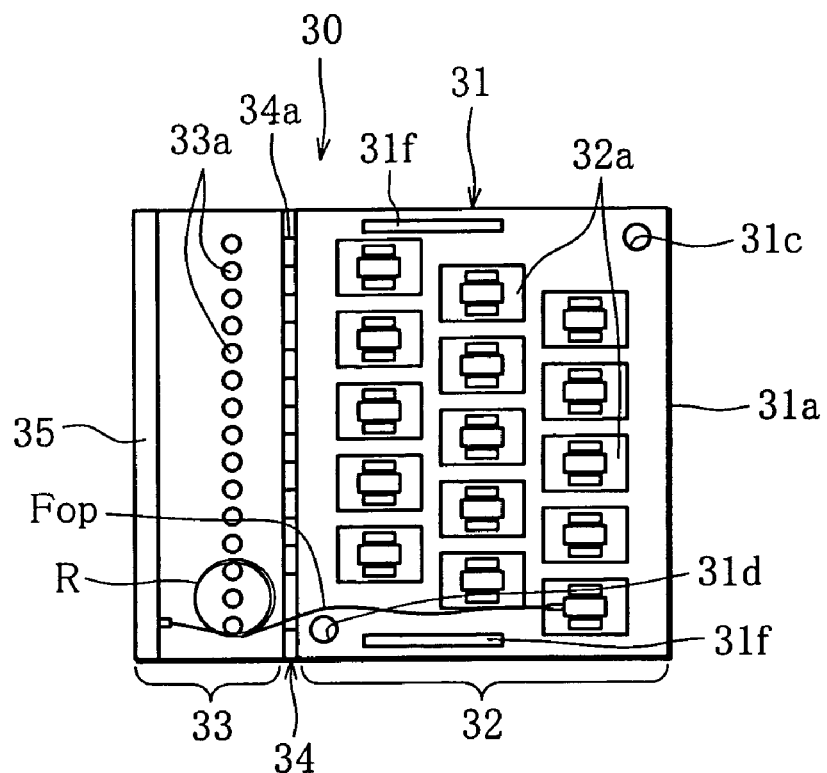
FIG. 6 is a plan view of a second inspection board, which is a second embodiment of an inspection board according to the present invention.
Figure 7:
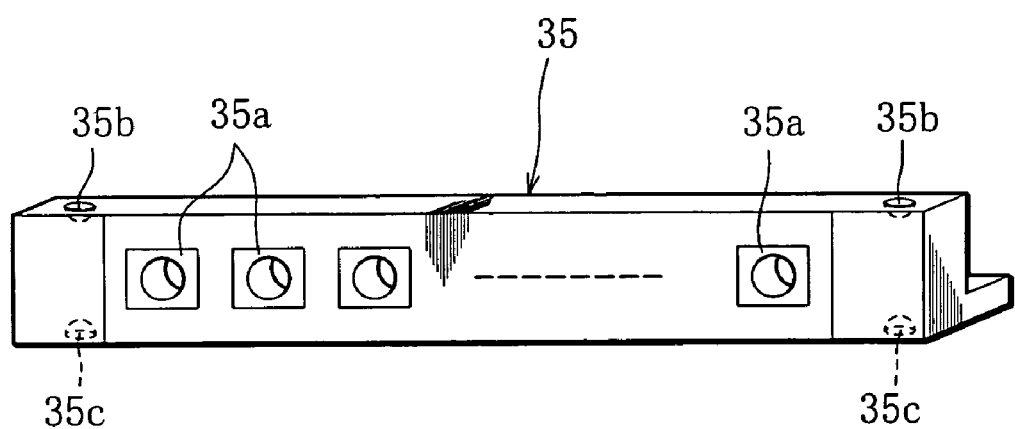
FIG. 7 is a perspective view showing an array plate with adapters, which is included in the second inspection board of FIG. 6.

As shown in FIGS. 6 and 7, the second inspection board 30 comprises a main body 31, a fitting part 32, a redundant-length handling part 33, an array plate 35 and handles 31f.

Like the first inspection board 20, the second inspection board 30 has the redundant-length handling part 33 where optical fibers are coiled. However, since the second inspection board 30 does not have the partition plate 24 or the cover 26, there is concern that the coiled portion R of an optical fiber will come off from a pin 33a. And it is for this reason that the second inspection board 30 is provided with the handles 31f on both lateral sides of the fitting part 32 thereof, as shown in FIG. 6, so that an operator can carry the inspection board in a state that the board is horizontally kept.

The main body 31 includes a quadrangular metal frame 31a formed with diagonally arranged holes 31c, 31d for positioning the inspection board 30. As will be described later, when the inspection board 30 is set on a board table 2a of an inspection apparatus II, positioning pins provided on upper and lower sides of the board table 2a fit into the holes 31c, 31d, whereby the inspection board 30 is set in right position relative to the inspection apparatus II. Further, the main body 31 has a guide plate 34 provided between the fitting part 32 and the redundant-length handling part 33. The guide plate 34 has a plurality of slits 34a in its upper portion, into which optical fibers Fop are fit. Thus, the optical fibers Fop are guided through the slits 34a.

Figure 8A:
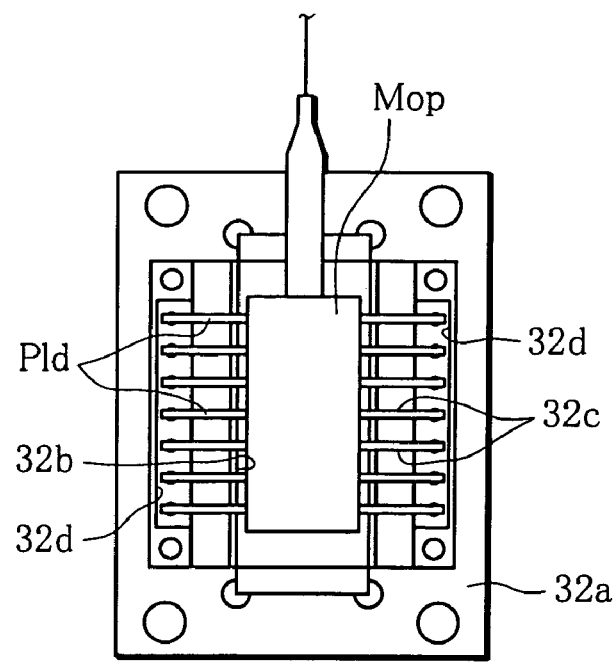
Figure 8B:
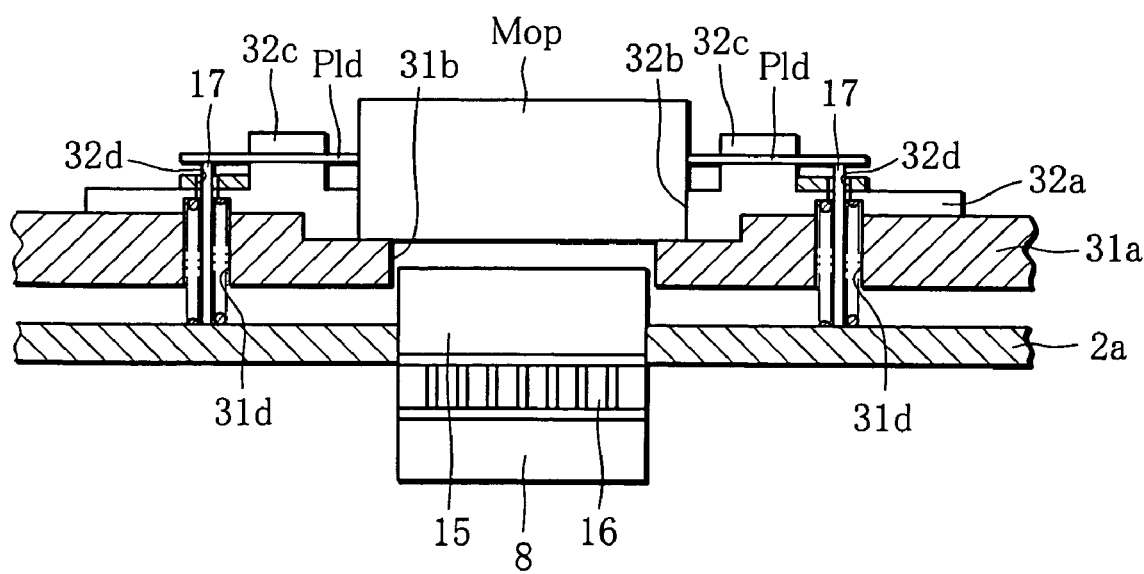

As shown in FIGS. 8A and 8B, the fitting part 32 has a plurality of openings 31b formed on the frame 31a thereof at the positions where optical modules Mop are to be fitted. Fitting blocks 32a each having an opening 32b in the middle thereof are fitted to the frame 31a so that the openings 31b and the openings 32b are communicated with each other. On both lateral sides of each opening 32b, positioning portions 32c for positioning a plurality of lead pins Pld of the optical module Mop are formed as grooves, where the number of the positioning portions 32c on each fitting block 32a corresponds to the number of lead pins Pld of the optical module Mop. The fitting part 32 of the second inspection board 30 are not equipped with connectors for electrical connection to lead pins Pld of the optical modules Mop. Instead, the frame 31a and each of the fitting blocks 32a have through holes 31d and 32d communicated with each other, through which contact probes 17 are inserted for electrical connection to the lead pins Pld of each optical module Mop.

The redundant-length handling part 33 is provided adjacent to the fitting part 32, and has a plurality of pins (catching members) 33a set up on the main body 31.

The pins 33a are used to catch coiled portions R of redundant-length portions of optical fibers Fop extending from optical modules Mop (see FIG. 6) to thereby prevent the entanglement and facilitate the handling of optical fibers Fop.

The array plate 35 is a member made of a longitudinal plate to be arranged in widthwise direction of the inspection board 30, and is fitted with a plurality of adapters 35a arranged at predetermined intervals in the longitudinal direction of the array plate 35, as shown in FIG. 7. Each of the adapters 35a is given a number (a channel number) for identification, corresponding to each fitting block 32a. An optical connector Cop (see FIG. 15) attached to each end of the optical fibers Fop of the optical modules Mop is detachably fitted to one of the adaptors 35a. Thus, the optical connectors Cop are arranged in a row at predetermined intervals, with their emission end faces exposed on the rear face of the array plate 35 (i.e., on the outer surface of the second inspection board).

Further, as shown in FIG. 7, the array plate 35 has positioning holes 35b, 35c in its upper and lower faces on both sides. As will be described later, when the inspection board 30 is set on a board table 2a of the inspection appratus II, positioning pins provided on upper and lower sides of the board table 2a fit into the holes 35b, 35c, whereby the inspection board 30 is set in right position relative to the inspection apparatus II.

In the method of inspecting optical modules according to the present invention, the inspection of a plurality of the optical modules Mop for optical characteristics and/or electrical characteristics thereof is carried out using the above-described inspection board 20 or 30, which is carried from one inspection apparatus to another in the state that the optical modules Mop are detachably fitted to the inspection board. Thus, since it is not necessary to fit and detach the optical modules Mop each time they are measured, inspection efficiency can be improved. Further, optical fibers Fop of the optical modules Mop fitted to the inspection board are prevented from being tangled and can be handled very easily.

Further, by giving identification numbers to the inspection boards 20, 30 and position numbers (channel numbers) to the fitting positions of the plurality of optical modules on the inspection boards 20, 30, it is possible to individually manage the optical module by the numbers.

Thus, the use of the inspection boards 20, 30 enables an unitary management of information on a plurality of inspection items by means of the numbers in a case that the management of information is dealt in electronic forms, which to a great extent improves the inspection efficiency of the optical modules Mop.

In addition, the inspection boards 20, 30 are provided with the handles 21f, 31f to facilitate the carriage of the inspection boards 20, 30 between inspection apparatuses, which further improves the inspection efficiency.

Here, note that an optical module to be inspected may be an LD module of so-called a butterfly-type having a plurality of lead pins, as shown in FIGS. 3 and 8A, and including an LD for emitting light, a built-in thermistor for detecting temperature of the LD, and a Peltier module for controlling the temperature of the LD.

(First Embodiment of a Method of Inspecting Optical Modules)

First, a method of inspecting optical modules (LD modules) using the first inspection board 20 will be described.

Figure 9:
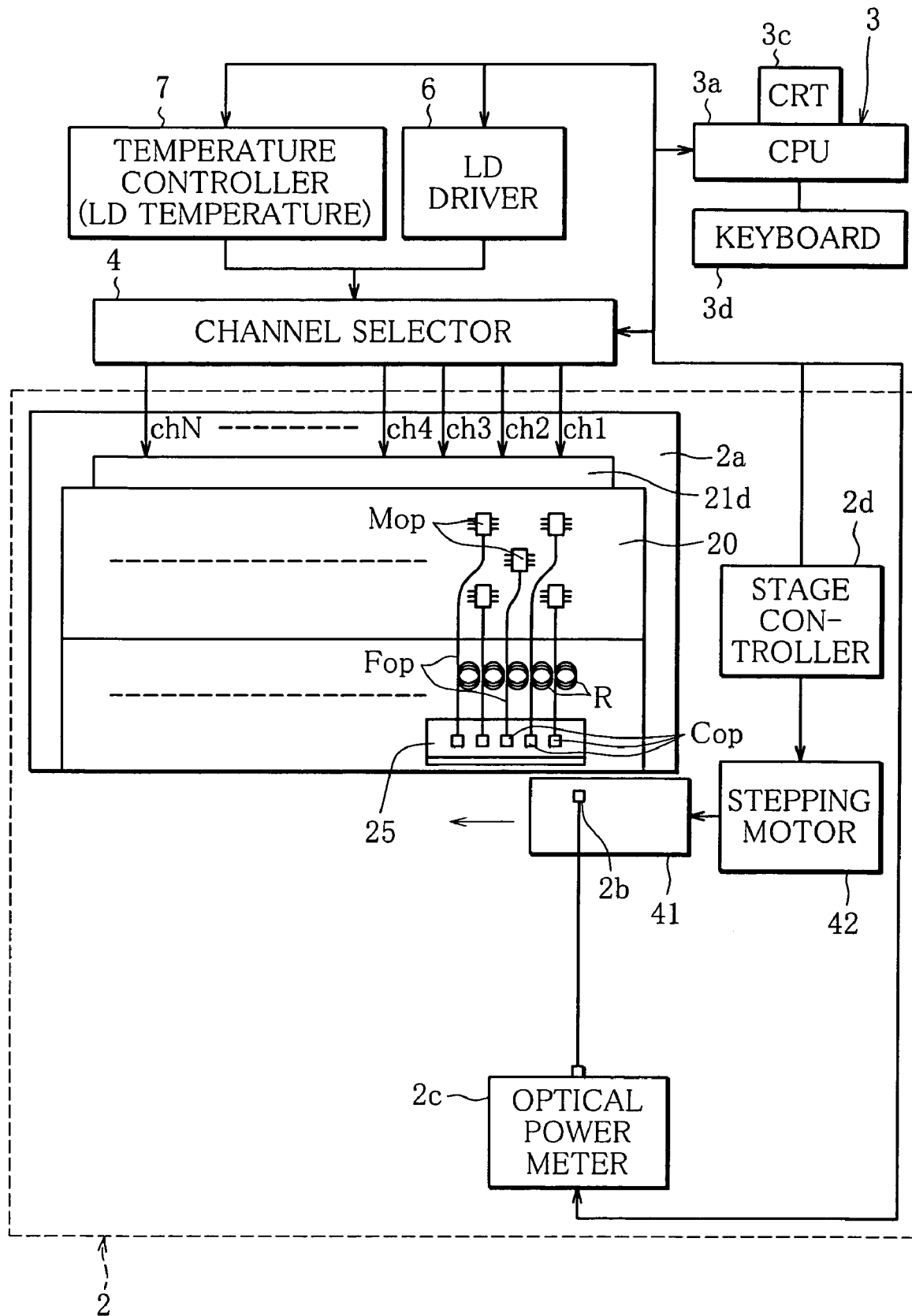
FIG. 9 is a diagram showing a system structure of an inspection apparatus I for use in a first embodiment of an inspection method according to the present invention.

FIG. 9 is a diagram showing a system of the inspection apparatus I for use in this inspection method. The inspection apparatus I is used to measure the optical output (L) as a function of operating current (I) supplied to the LD in the optical module Mop (hereinafter referred to simply as "I-L characteristic"), before and after an application of temperature cycles to the optical modules.

As shown in FIG. 9, the inspection apparatus I comprises a measurement part 2 including an optical power meter 2c for measuring the I-L characteristic, a stage controller 2d, a stepping motor 42 and a stage 41, a control part 3, a driving part (LD driver) 6, a temperature control part (temperature controller) 7, and a channel selector 4.

As shown in FIG. 9, the measurement part 2 has a board table 2a on which the first inspection board 20 is set. The first inspection board 20 set on the board table 2a is connected to the control part 3 through an electrical connector 21d.

To the optical power meter 2c, a light receiving part (measuring head) 2b including a photodiode is connected through an attenuator not shown. The light receiving part 2b is arranged on the stage 41 to face the array plate 25 of the first inspection board 20 and is intermittently moved at a predetermined intervals along the array plate 25 in the direction indicated by an arrow in FIG. 9 on the basis of an instruction from the stage controller 2d, to properly face one by one the optical connectors Cop detachably fitted in the adapters 25a. At each position of the light receiving part 2b, the optical power meter 2c measures the optical output (L) of an optical module Mop as a function of the operating current (I) supplied to an LD in terms of an electric signal received from the light receiving part 2b.

Simultaneously, at each position of the light receiving part 2b, the operating voltage (V), the monitor current (Im), and/or other characteristics are measured as a function of operating current (I). In such a measuring process, supply of the operating current to the LD and taking of data of the operating voltage (V), the monitor current (Im), etc. into the control part 3 is performed through the electrical connector 21d of the first inspection board 20.

Figure 13:
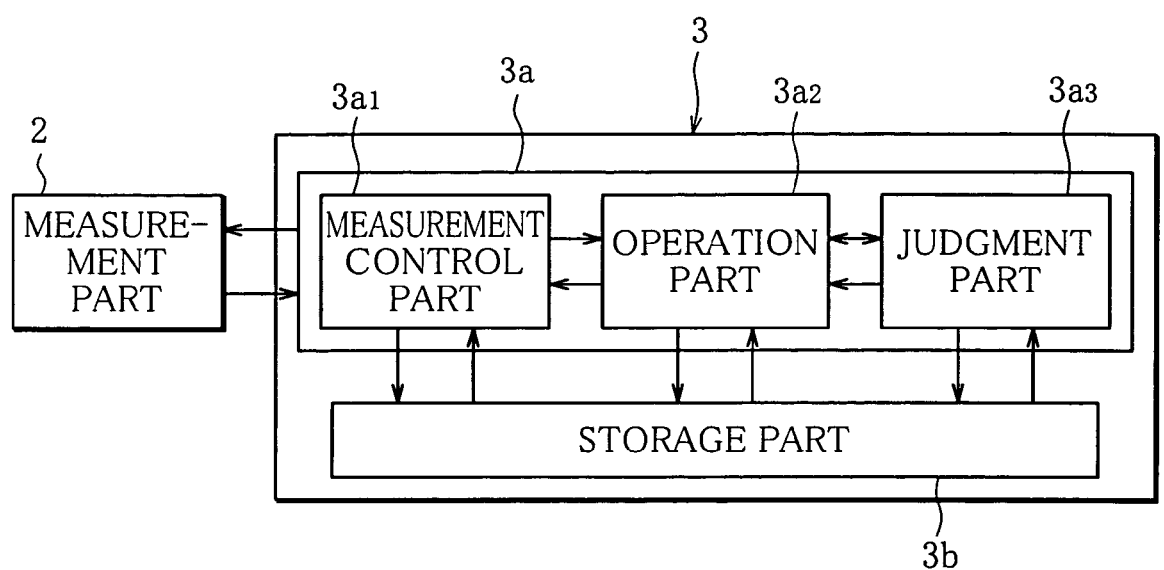
FIG. 13 is a conceptual diagram showing an internal structure of a control part shown in FIG. 9.

As shown in FIG. 13, the control part 3 comprises a central processing unit (CPU) 3a and a storage part 3b. The control part 3 is electrically connected to the above-mentioned components of the inspection apparatus I and controls their operation so as to store data of various kinds of characteristics such as I-L on each optical module, perform predetermined operations on the stored data, and thereby screen optical modules on the basis of predetermined criterion. As shown in FIG. 9, the CPU 3a controls the channel selector 4 to select an optical module Mop to be controlled by the temperature controller 7 and the LD driver 6. As shown in FIG. 9, a personal computer, which is provided with a display (CRT) 3c for displaying inspection information and an input device such as a keyboard 3d for allowing an operator to input data thereto, is used as the control part 3.

The LD driver 6 obeys an instruction from the control part 3 to supply the operating current to an optical module which the channel selector 4 has selected among the plurality of optical modules detachably fitted to the first inspection board 20.

The temperature controller 7 obtains temperature information from the built-in thermistor in the optical module selected by the channel selector 4, and controls the built-in Peltier module in the optical module to thereby control the temperature of the LD thereof.

A method of inspecting optical modules according to the first embodiment is carried out as follows, using the first inspection board 20 set on the board table 2a of the first inspection apparatus I, with a plurality of fabricated optical modules Mop being fitted to the board:

First, an optical module Mop is fitted to each fitting block 22a of the first inspection board 20 by means of the fitting member 22c, with a plurality of lead pins Pld of the optical module Mop being connected with corresponding connectors 28a. In doing so, each optical module is fixedly pressed by a the screw 22e and the spring 22f.

Next, a coiled portion R of a redundant-length portion of the optical fiber of each optical module Mop is arranged around the pin 23a, and the partition plate 24 is fitted onto the support plates 23b such that upper portion of each pin 23a projects through each opening 24c formed in the flat portion 24d of the partition plate 24 beyond the upper face thereof.

Then, each of the fifteen optical fibers Fop with their coiled portions R caught around the pins 23a is once drawn back toward the fitting part 22, then guided from under the partition plate 24 along the outside of the guide portion 24a to over the partition plate 24, and then guided forth to the array plate 25.

Then, the optical connectors Cop at the ends of the optical fibers Fop are fitted respectively into the corresponding adapters 25a on the array plate 25.

Thus, optical modules Mop can be fitted to and detached from the first inspection board 20 so easily that it is possible to shorten the time required for fitting and detaching optical modules.

In addition, the coiled portions R of redundant-length portions of optical fibers Fop of the plurality of optical modules Mop are caught around respective pins 23a, and covered with the partition plate 24, in the state that the pins 23a project through the openings 24c. The configuration makes it possible to prevent an accident where the plurality of optical fibers Fop are tangled, spread excessively beyond the redundant length handling part 23, and hooked on jigs or the like located at the surroundings to be broken during the handling of the first inspection board 20 or during the inspection of optical modules Mop.

Next, the first inspection board 20 to which the optical modules Mop are fitted is set on the board table 2a of the inspection apparatus I. Then, the first inspection board 20 is placed in right position relative to the inspection apparatus I by means of the holes 25b, 25c formed on the array plate 25. The electrical connector 21d of the main body 21 is connected to a corresponding electrical connector (not shown) of the inspection apparatus I.

A safety cover (not shown) of the measurement part 2 is put down on the first inspection board 20 to put it in an enclosed space, and then a first inspection is started for the plurality of optical modules Mop, which may be on the driving current (I) and the optical output (L).

First, in the state that the optical modules Mop are fitted to the first inspection board 20, the driving current (I) and the optical output (L) are measured on each optical module Mop (inspection 1).

The measurement is carried out by moving the light receiving part (measuring head) 2b of the optical power meter 2c along the array plate 25 on the basis of an instruction from the control part 3 to cause the light receiving part 2b to intermittently face each of the optical connectors Cop, exposed on the rear face of the array plate 25, through the adapter thereof at a predetermined intervals. Since the optical connectors Cop are exposed on the rear face of the array plate 25, the light receiving part 2b of the optical power meter 2c only needs to move along the array plate 25. Hence, the speedup of inspection can be achieved.

Next, the first inspection board 20 is taken off from the board table 2a, and the cover 26 is laid over the partition plate 24 through the two support plates 24b, in order to protect those portions of the optical fibers Fop located over the upper face of the partition plate 24.

Then, the first inspection board 20, with the optical modules Mop being fitted to, is put in an environmental chamber, where temperature cycles (−40° C. ~85° C.) are applied to the first inspection board 20. After a predetermined number of temperature cycles are applied, the cover 26 is removed, and the first inspection board 20 is set again on the board table 2a of the inspection apparatus I in order to measure again the driving current (I) and the optical output (L) on each optical module Mop in the same manner as above (inspection 2).

Meanwhile, prior to the inspections 1 and 2, a storage region (A) is allocated in the storage part 3b of the control part 3a to the identification number of each first inspection board 20. In each of the storage region (A), storage areas (B) are allocated to the respective optical modules Mop, each given the channel number, fitted to the first inspection board 20. In each of the storage area (B), conditions and results of measurement on the driving current (I), optical output (L), monitor current (Im), driving voltage (V), etc. in the inspections 1 and 2, and results of operation performed on these data (including logical operations like judgment) are written.

By referring to the identification number of a first inspection board 20 and a channel number in the first inspection board 20, the measurement data on a particular optical module Mop before and after application of temperature cycles are read out, processed through a predetermined operation and compared with a predetermined criterion, whereby a screening of the optical module Mop is performed.

For example, in case of judging pass or fail of an optical module Mop based on the rate of change ΔP in optical output, an operation represented by the following equation is performed:

$$\Delta P = \{(P1-P2)\}/P1 \times 100(\%),$$

where P1 and P2 are optical outputs at a predetermined driving current before and after application of temperature cycles, respectively.

In the above example, the control part 3 decides that the optical module is acceptable if the rate of change ΔP calculated according to the above equation is within a predetermined criterion, in the range of −3% ~+3% for instance.

After the temperature cycle screening is finished in this way, the current-feeding burn-in screening is carried out in the state that the optical modules Mop remain fitted to the first inspection board 20.

The current-feeding burn-in screening is a process through which, similarly to the abovementioned temperature cycle screening, pass or fail is judged for an optical modules Mop by comparing with a predetermined criterion on the basis of the rates of change in various characteristics (such as optical output, operating voltage, or monitor current) that would be obtained from predetermined measurements carried out before and after application of temperature cycles while feeding a predetermined level of operating current to operate the optical module Mop.

In this way, in the first inspection, since the first inspection board 20 is used to fit a plurality of optical modules and subjected to inspection as a whole, it is not necessary to detach and fit the optical modules to an inspection apparatus each time inspection is carried out. Therefore, it is possible to improve the efficiency of inspection in the inspection apparatus I by fitting optical modules Mop to the first inspection board 20 in advance.

It is to be noted that, in addition to the above-mentioned rate of change ΔP of optical output, other characteristics such as the current of a photodiode (monitor current: Im), the operating voltage of an LD (V), the threshold current of the LD, the saturation current of the LD, etc. may be used to judge pass or fail of the optical module Mop.

Further, more complicated operations, including numerical calculations and logical operations, may be performed on measurement data to judge pass or fail of the optical module Mop, instead of the simple logical operation of comparing the rate of change ΔP of optical output with a predetermined criterion, which was concretely described above.

FIGS. 10 and 11 are diagrams each showing a data structure of data stored in the storage part 3b.

FIG. 10 and FIG. 11 show data structures of data stored in respect of inspection carried out before and after application of temperature cycles, respectively.

Each data structure comprises a product data area, a measurement condition data area, and a measurement result data area.

In the product data area, module numbers for identifying optical modules, inspection board numbers for identifying inspection boards, channel numbers for identifying positions on an inspection board, an operator identification number, etc. are stored before starting the inspection of the optical modules. The items contained in this area is in common before and after application of temperature cycles.

In the measurement condition data area, inspection type (i.e., the distinction of the inspection before (inspection 1) or after (inspection 2) application of temperature cycles), case temperature, LD temperature (control target temperature based on the resistivity of a built-in thermistor in an optical module), the maximum sweep driving current, etc. are stored. These items are in common before and after application of temperature cycles. However, as shown in FIG. 11, a criterion on ΔP used to judge pass or fail of the optical module Mop is stored in the measurement condition data area for inspection after application of temperature cycles.

In the measurement result data area are stored plot data of I-L curve (correlational data between the current and the optical output) etc., which is sent from the inspection apparatus I during inspection, and secondary data obtained by processing the plot data (differential coefficients of various characteristics with respect to the driving current, etc.). These items are in common before and after application of temperature cycles. However, as shown in FIG. 11, pass/fail judgment on the optical module Mop is stored in the measurement result data area for inspection after application of temperature cycles.

Needless to say, it is possible to integrate the data structures shown in FIGS. 10 and 11 into one structure, as shown in FIG. 12.

Figure 14:
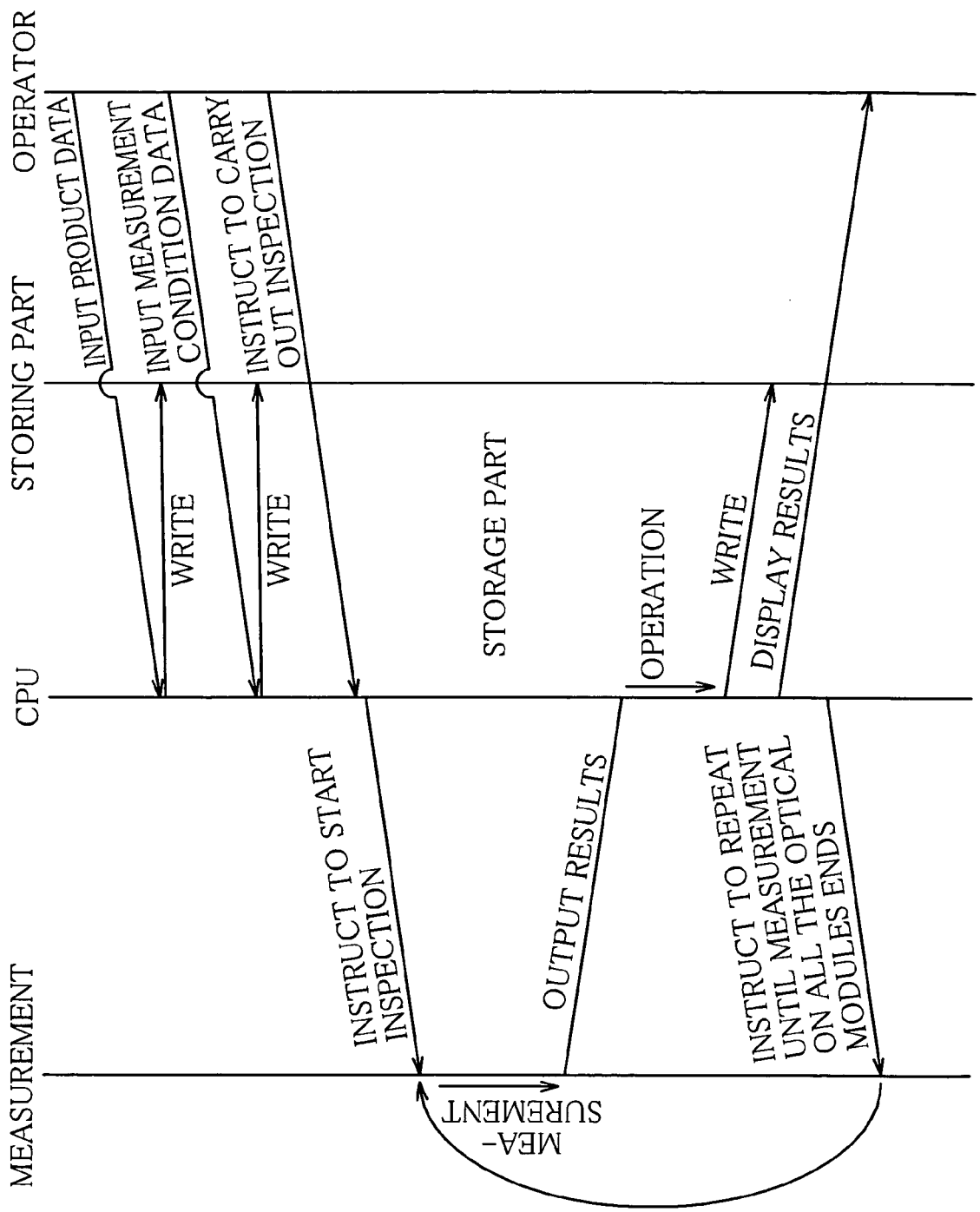
FIG. 14 is a sequential diagram showing an operation of the control part in the first embodiment of the inspection method according to the present invention.

FIG. 13 is a conceptual diagram showing an internal structure of the control part 3 used in the present embodiment, and FIG. 14 is a diagram showing a sequence of the processes of inspection. The processes shown in the diagram are in common before and after application of temperature cycles.

As shown in FIG. 13, the CPU 3a comprises a measurement control part 3a1, an operation part 3a2, and a judgment part 3a3.

Inspection is performed as follows: First, as shown in FIG. 14, an operator inputs product data and measurement condition data when the inspection apparatus is in the initial waiting state. Then, the measurement control part 3a1 writes these data in the product data area and the measurement condition data area of a storage area shown in FIG. 10, respectively.

It is to be noted that, when inspecting after application of temperature cycles, the measurement control part 3a1 uses the inspection board number and the inspection type indicative of being after application of temperature cycles, which is inputted by the operator, to read out the data which have been stored before application of temperature cycles corresponding to the same inspection board number, and automatically generate the same necessary data, whereby a cumbersome inputting work of the operator is reduced.

Next, the operator sets a first inspection board 20, to which optical modules Mop are fitted, on the inspection apparatus I, and inputs an inspection start command. Then, the measurement control part 3a1 suitably reads data from the measurement condition data area in order of the channel number, letting the inspection apparatus I perform the inspection of the optical modules in accordance with the measurement condition data.

Further, the measurement control part 3a1 writes measurement data such as I-L curve plot data generated from the inspection apparatus I, in the measurement result data area of the storage area, and sends the plot data to the operation part 3a2.

The operation part 3a2 performs predetermined operation on the plot data to generate secondary data such as optical outputs P1 and/or P2 at predetermined values of driving current, differential coefficients of various characteristics with respect to driving current etc., and writes these secondary data in the measurement result data area.

Specifically, when the inspection type data is indicative of inspection after application of temperature cycles, the operation part 3a2 suitably reads data of the inspection before and after application of temperature cycles, to calculate the rate of change $\Delta P$ in optical output, etc., which is to be used in judging pass or fail of the optical module Mop, writes the calculated value of $\Delta P$ etc. in the measurement result data area of the storage area, and sends the calculated value of $\Delta P$, etc. to the judgment part 3a3.

The judgment part 3a3 reads the criterion on $\Delta P$ from the measurement condition data area, makes pass/fail judgment (logical operation) on the optical module based on the criterion, and writes the result in the measurement result data area of the storage area.

In the present embodiment, for example, I-L measurement is performed in the state that the optical modules Mop to be inspected are fitted to the first inspection board 20. Then, temperature cycles are applied to the first inspection board 20 in the state that the optical modules Mop are fitted to the board, and thereafter I-L measurement is performed again. From the results of the two measurements, the rate of change $\Delta P$ in optical output is calculated and used in pass/fail judgment on each optical module Mop.

The use of the above-described data structure and inspection process can eliminate the need to repeatedly input identification numbers of optical modules Mop and necessary data each time the first inspection board 20 is moved from the inspection apparatus I to the environmental chamber, then from the environmental chamber back to the inspection apparatus I, in judging pass or fail of the optical modules. An optical module can be properly accessed only by inputting the board number of the first inspection board 20 to be inspected. In addition, it is possible to store the inspection data both before and after application of temperature cycles by the identification number of first inspection board 20.

Further, in this embodiment, storage regions are allocated to identification numbers given to respective inspection boards, and within each of those storage areas are allocated storage areas to respective channels. Therefore, it is possible to unitarily manage measurement data and to thereby improve the inspection efficiency on a very large number of optical modules fitted to a large number of inspection boards.

Thus, by inspecting board by board the optical modules Mop fitted to the first inspection boards 20, it is possible to adopt a data structure capable of accessing each optical module Mop by an identification number of first inspection board, and a channel number on the board, to thereby simplify data inputting in the inspection of the optical modules Mop and to improve an efficiency of data processing.

Further, in case where the optical modules Mop are subject to another inspection on another inspection apparatus after being finished with inspection on the inspection apparatus I, it is still possible to unitarily manage the characteristic data of the optical modules obtained over the plurality of inspection apparatus, simply by inputting identification numbers of first inspection boards 20 to add necessary data on the above storage areas.

(Second Embodiment of a Method of Inspecting Optical Modules)

Next, a method of inspecting optical modules (LD modules) using the second inspection board 30 will be described.

Figure 15:
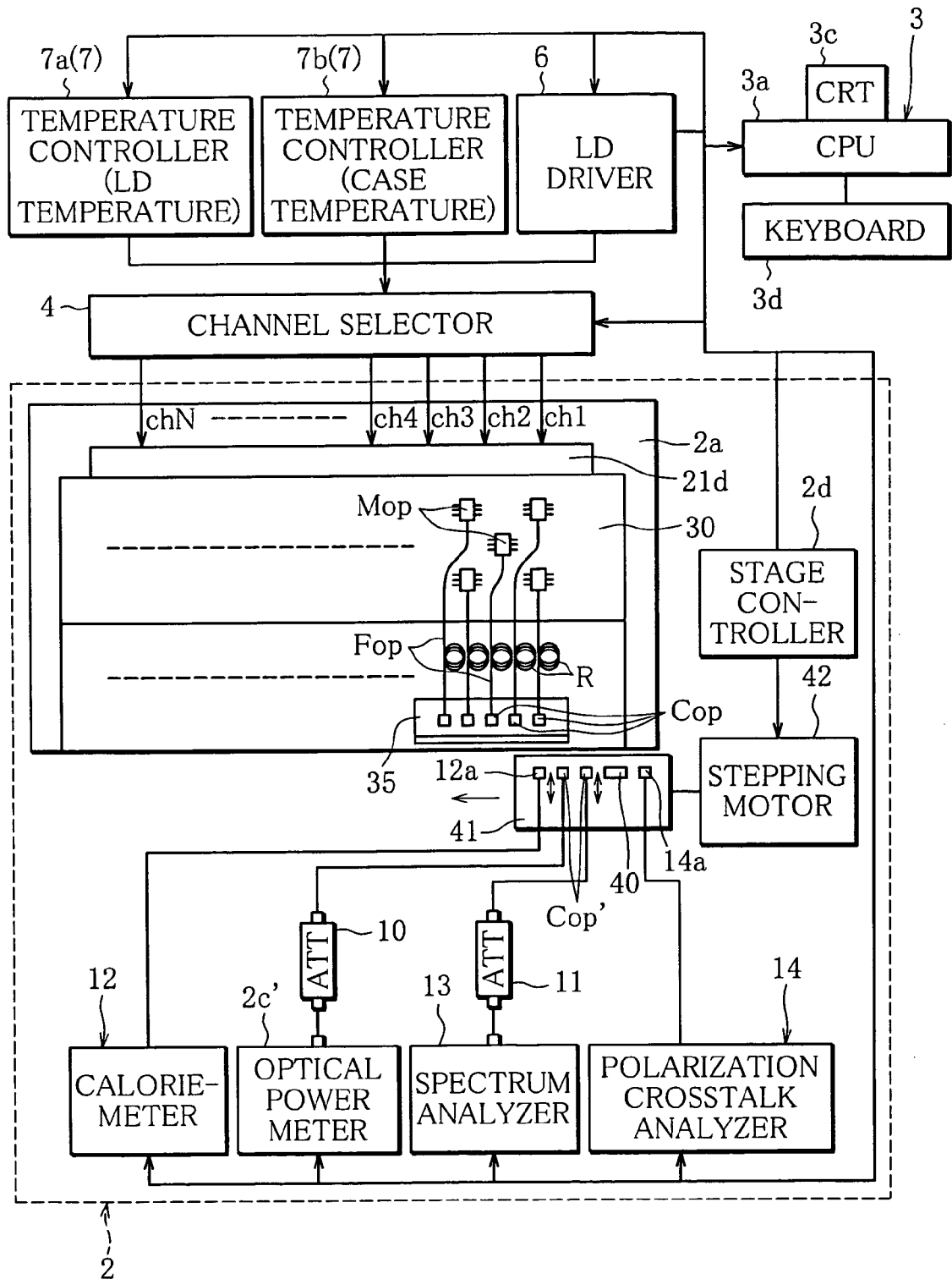
FIG. 15 is a diagram showing a system structure of an inspection apparatus II for use in a second embodiment of an inspection method according to the present invention.

FIG. 15 is a diagram showing a system of an inspection apparatus II for use in this inspection method. The inspection apparatus II is used to measure not only optical output characteristics of optical modules but also oscillation spectrum and extinction ratio of emitted light, and electrical characteristics such as driving current and voltage of built-in Peltier modules in the optical modules under predetermined conditions of driving temperature. In the following description, the same components as those of the inspection apparatus I will be referred to by the same reference numerals, and duplicate explanation thereof will be omitted.

As shown in FIG. 15, the inspection apparatus II comprises a measurement part 2, a control part 3 and a driving part (LD driver) 6, which are each configured similarly to those of the inspection apparatus I. The inspection apparatus II further comprises a temperature control part (temperature controllers 7a, 7b), coolers 8 (see FIG. 16A), a first attenuator 10, a second attenuator 11, a calorimeter 12, a spectrum analyzer 13, a polarization crosstalk analyzer 14 and an optical power meter 2c'.

Unlike the optical power meter 2c of the inspection apparatus I, the optical power meter 2c' is designed to receive light from an optical connector Cop', which functions as a light receiving part, through the optical attenuator 10, and perform photoelectric conversion by an internal photodiode thereof.

Figure 16A:
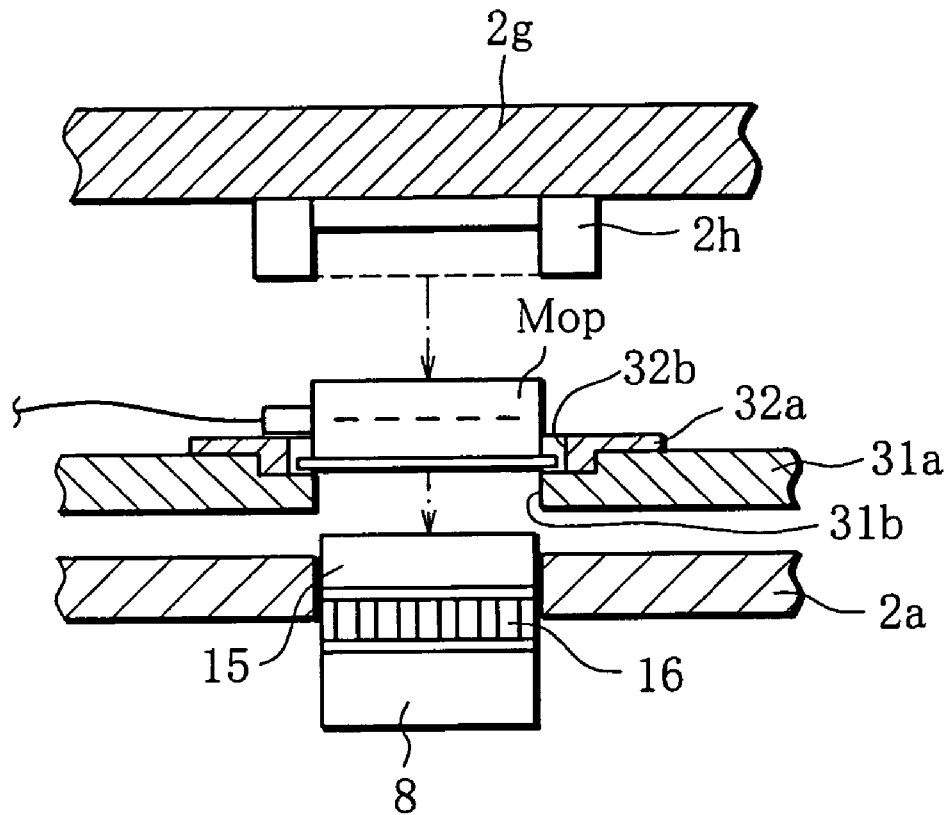

The measurement part 2 on which the second inspection board 30 is set comprises a board table 2a and a top plate 2g as shown in FIGS. 15 and 16A.

As shown in FIGS. 8B and 16A, optical modules Mop are fitted to fitting blocks 32a arranged on the frame 31a of the second inspection board 30 with their respective bottom faces exposed through the openings 31b of the frame 31a and the openings 32b of the fitting blocks 32a communicated with each other.

Figure 16B:
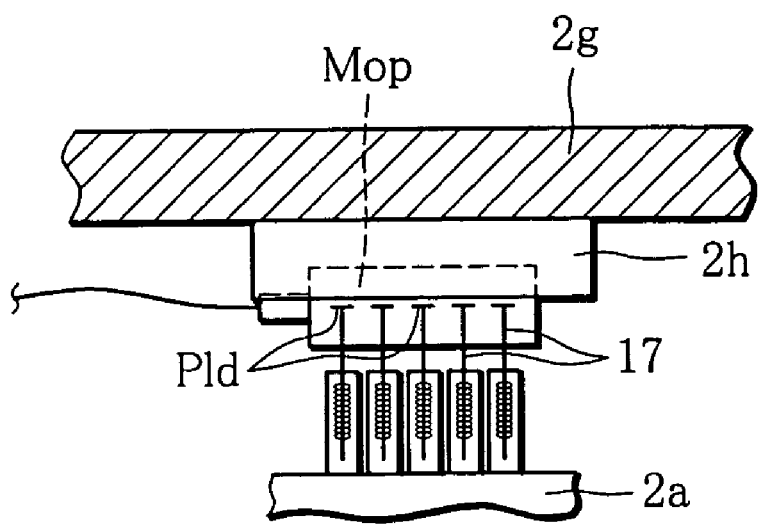

To the board table 2a, heat sinks 15 are fixed at the places corresponding to the openings 31b of the frame 31a. An external Peltier module 16 and a cooler 8 are fixed under each heat sink 15. In addition, contact probes 17 are set up on the board table 2a at the places where the lead pins Pld of each optical module Mop are to be located. As shown in FIGS. 8B and 16B, each contact probe 17 is pressed upward by a spring to exert a contact pressure to a lead pin Pld.

The top plate 2g has covers 2h on its lower face so that each cover 2h may press an optical module Mop against the heat sink 15 with a predetermined pressure, and their lead pins Pld against corresponding contact probes 17.

The temperature controller 7a obtains temperature information from a built-in thermistor in an optical module Mop, and controls the temperature of an LD by controlling a current supplied to a built-in Peltier module in the optical module Mop. The other temperature controller 7b detects the temperature of a lower part of the optical module (case temperature) and keeps the case temperature constant by driving the external Peltier module 16.

Each cooler 8 is configured to cool constantly the bottom face of the external Peltier module 16 during inspection with cooling water for example, so as to prevent back flow of heat toward the external Peltier module 16, whereby inspection of the optical modules Mop can be performed in a thermally stable state.

The first attenuator 10 is connected between an optical connector Cop' and the optical power meter 2c' to attenuate the intensity of light emitted from each optical module Mop before entering the optical power meter 2c'.

The second attenuator 11 is connected between an optical connector Cop' and the spectrum analyzer 13 to attenuate the intensity of light emitted from each optical module Mop before entering the spectrum analyzer 13.

The calorimeter 12 measures the calorific power (mW) of light emitted from each optical module Mop. (This measurement will be referred to simply as "calorific power measurement".)

The spectrum analyzer 13 is connected to each optical module Mop fitted to the inspection board 30 through the second attenuator 11, to obtain the spectral distribution of power (mW) of light emitted from the optical module Mop. (This measurement will be referred to as "spectrum measurement".)

The polarization crosstalk analyzer 14 measures the extinction ratio of light emitted from each optical module Mop. (This measurement will be referred to simply as "extinction ratio measurement".)

The inspection apparatus II, while keeping the case temperature at a predetermined value by means of the temperature controller 7b, monitors a resistivity of a built-in thermistor of each optical module Mop through the temperature controller 7a, and performs measurements on electrical characteristics such as the current flowing through, the voltage across, and the power consumption of the built-in Peltier module in each optical module Mop in the state that the built-in Peltier module is driven so as to keep the resistivity of the built-in thermistor at a predetermined value. (This measurement will be referred to as "electrical characteristic measurement".)

Here, the optical power meter 2c' and the spectrum analyzer 13 each have an optical connector Cop' which can be detachably fitted to an adapter 35a on the array plate 35. In the measurement, the optical connector Cop' is connected with the connector Cop of an optical module Mop which is detachably fitted to an adapter 35a, whereby a light emitted from the optical module Mop is received.

In the present embodiment, the calorimeter 12 and the polarization crosstalk analyzer 14 are not equipped with connector as described above, but they are so designed that light receiving parts 12a and 14a thereof may directly receive light emitted from the connector Cop of an optical module Mop which is detachably fitted to an adapter 35a on the array plate 35. Needless to say, however, it is possible for the calorimeter 12 or the polarization crosstalk analyzer 14 to be equipped with a connector that is to be connected with the connector Cop of the optical module Mop during the measurement.

The respective measuring heads (including the optical connectors Cop') of the optical power meter 2c', spectrum analyzer 13, calorimeter 12, and polarization crosstalk analyzer 14, and a leak light shutter 40 to be used during the measurement of electrical characteristics, are arranged on a stage 41 in a row at predetermined intervals in order of measurement. The measuring heads and the leak light shutter 40 are arranged to face the array plate 35 of the inspection board 30, and intermittently moved at predetermined intervals along the array plate 35, by moving the stage 41 in the direction indicated by an arrow in FIG. 15 using a stepping motor 42 actuated on the basis of instructions from a stage controller 2d.

A method of second inspection using the inspection apparatus II having the above-described structure will be described below.

Here, it is to be noted that all the measurements are performed, monitoring only the temperature of a built-in thermistor in each optical module Mod, or monitoring both the temperature of the built-in thermistor and the case temperature thereof.

First, as shown in FIG. 8(a), each optical module Mop is fitted in the center of a fitting blocks 32 by means of the positioning portions 32c and opening 32b. Then, the coiled portion R of a redundant-length portion of an optical fiber Fop of each optical module Mop is arranged around a pin 33a.

Then, the optical connectors Cop attached to the ends of optical fibers Fop are all fitted to the corresponding adapters 35a on the array plate 35.

The specific adapter 35a to which an optical connector Cop should be fitted is predetermined according to which position the optical module Mop is placed in, and for convenience sake, the adapters 35a are numbered as channel 1, channel 2, etc., respectively from one end in order of position.

A plurality of second inspection boards 30, each having a plurality of optical modules Mop fitted to the fitting blocks 32a, are prepared in the above-described manner, and thereafter, the inspection of the optical modules Mop is started.

First, a second inspection board 30 is set on the inspection apparatus II. Then, the board table 2a is raised from the underside of the frame 31a until the heat sinks 15 abut on the bottoms of the corresponding optical modules Mop and the contact probes 17 come in contact with the corresponding lead pins Pld of the optical modules Mop. Then, the top plate 2g is lowered from the above side of the frame 31a so that the covers 2h on the lower face of the top plate 2g may press the optical modules Mop against the heat sinks 15 with a predetermined pressure and the lead pins Pld against the corresponding contact probes 17 (see FIG. 16).

In this state, the calorimeter 12 is first to face the optical connector in channel 1, and then a calorific power measurement is performed on channel 1 as shown in FIG. 17A.

After this calorific power measurement is finished, the stepping motor is actuated to connect the light receiving part of the calorimeter 12 to channel 2 and the optical power meter 2c' to channel 1 through the optical connector. In this state, I-L measurement and calorific power measurement are performed in parallel on channel 1 and channel 2, respectively, as shown in FIG. 17B.

After these measurements are finished, the stepping motor is actuated again to connect the spectrum analyzer 13 to channel 1, the optical power meter 2c' to channel 2, and the calorimeter 12 to channel 3. In this state, spectrum measurement, I-L measurement and calorific power measurement are performed in parallel on channel 1, channel 2 and channel 3, respectively, as shown in FIG. 17C.

After these measurements are finished, in like manner, the leak light shutter is connected to channel 1, the spectrum analyzer 13 to channel 2, the I-L measurement photodiode to channel 3, and the calorimeter 12 to channel 4. In this state, electrical characteristic measurement, spectrum measurement, I-L measurement and calorific power measurement are performed in parallel on channel 1, channel 2, channel 3 and channel 4, respectively, as shown in FIG. 17D.

Figure 18A:
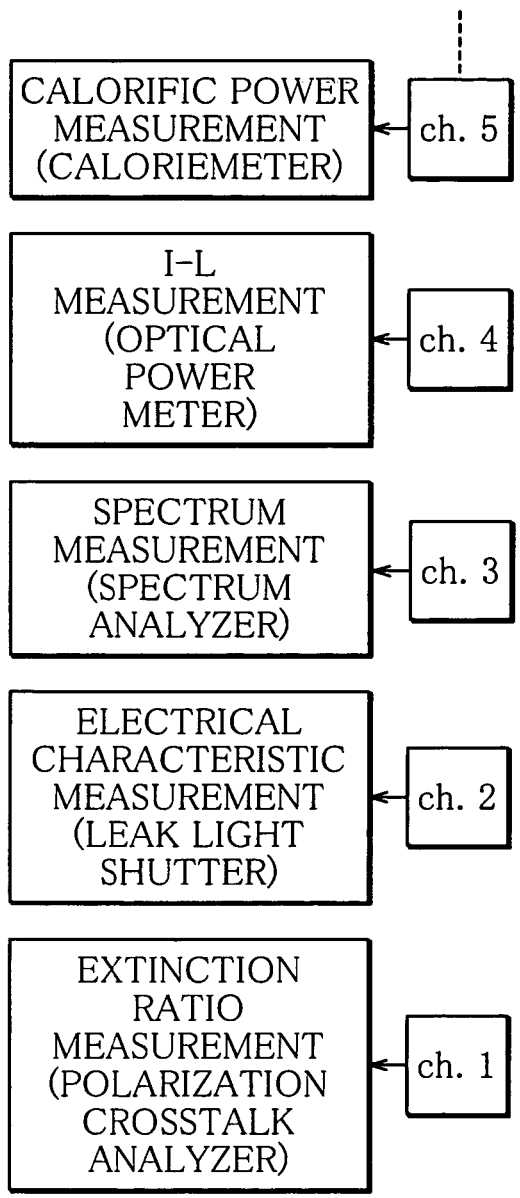
FIGS. 18A and 18B are flowcharts showing flows of inspection in the second embodiment.

After these measurements are finished, in like manner, extinction ratio measurement, electrical characteristic measurement, spectrum measurement, I-L measurement and calorific power measurement are performed in parallel on channel 1, channel 2, channel 3, channel 4 and channel 5, respectively, as shown in FIG. 18A.

Figure 18B:
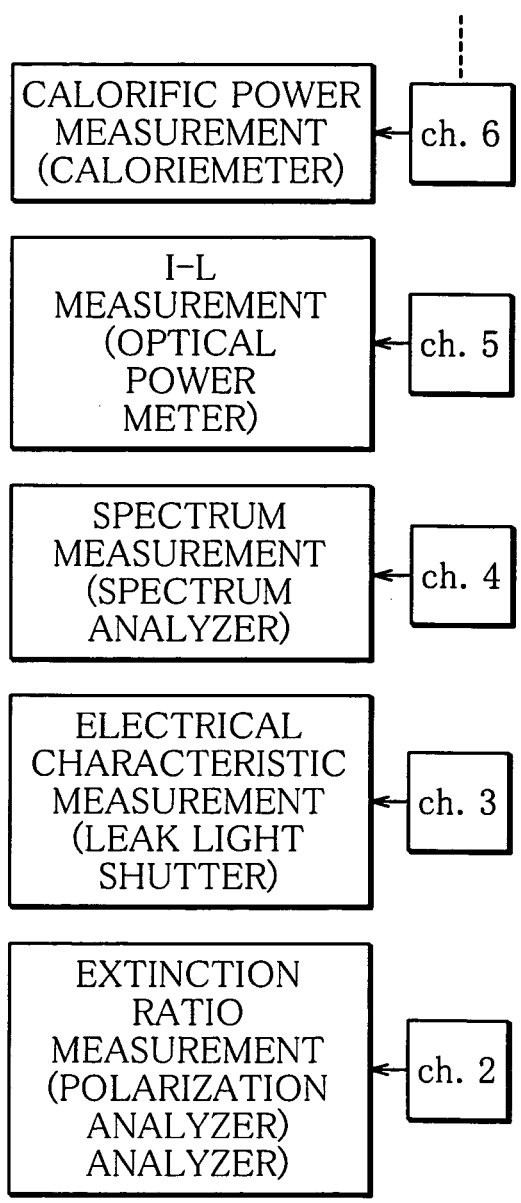

Then, the channel 1, being finished with all the five items of measurement, is excluded from the measurement, and extinction ratio measurement, electrical characteristic measurement, spectrum measurement, I-L measurement and calorific power measurement are performed in parallel on channel 2, channel 3, channel 4, channel 5 and channel 6, respectively, as shown in FIG. 18B.

Using the second inspection board 30, such measurement is repeated through all the channels (optical modules), in which the five items are simultaneously performed in parallel.

In this way, in the method of inspecting optical modules using the second inspection board 30, since measurements of different kinds of item are performed in parallel on a plurality of optical modules, it is possible to eliminate the time wasted on waiting for one optical module being finished with all kinds of measurement before starting measurements on another optical module, whereby the throughput of optical module inspection can be improved.

In addition, the second inspection of optical modules by uses of the second inspection boards 30 is performed board by board, similarly to the case of the first inspection. Therefore, it is possible to improve the inspection efficiency of inspection apparatus II by fitting optical modules to the inspection boards in advance.

FIG. 19 is a diagram showing a data structure adopted by the inspection apparatus II of data stored in a storage part 3b allocated to each second inspection board 30.

As shown in FIG. 19, the data structure comprises a product data area, a measurement condition data area, and a measurement result data area.

In the product data area, module numbers for identifying optical modules, channel numbers for identifying positions on each inspection board, an operator identification number, etc. are stored before inspection of optical modules.

In the measurement condition data area, case temperature, LD temperature, pass/fail criterion, etc. during each measurement are stored before inspection of optical modules.

In the measurement result data area are stored suitably, raw data which are output from the inspection apparatus II during inspection, such as plot data of I-L curves (correlational data between the current and the optical output), plot data of spectral curves (correlational data between the wavelength and the optical intensity), electrical characteristic data of a built-in Peltier module, and extinction ratio data, and additionally, secondary data obtained by processing the raw data, and the result of pass/fail judgment, etc.

During the inspection of optical modules on the above items, the results of measurement are output in order of channel number, starting from channel 1, and stored in allocated storage areas.

It is to be noted that in addition to the I-L curve plot data, I-V curve plot data (correlational data between the driving current and the driving voltage of an LD) and L-Im curve plot data (correlational data between the optical intensity of forward light and the current intensity obtained by photoelectric conversion of backward light at the monitor photodiode) may be output and stored in the allocated storage areas, for use in evaluating an optical module.

Thus, by inspecting board by board optical modules Mop fitted to the second inspection boards 30, it is possible to adopt a data structure capable of accessing each optical module Mop by a channel number on the second inspection board 30. This in turn makes it possible to simplify data inputting in the inspection of the optical modules Mop and enables unitary management of data over a plurality of inspection items.

The embodiments of the inspection apparatus and method according to the present invention have been described above. It is to be noted that the method of inspecting optical modules and the inspection board according to the present invention are not restricted to the above-described embodiments.

For example, in the method of inspecting optical modules using the inspection board 20 or 30, the light to be measured may be emitted from each optical module into space and may be received directly by the photodiode for I-L measurement or the spectrum analyzer through an attenuator or a lens.

Inspection items and pass/fail criterion may be decided as desired, within the scope of the present invention.

Needless to say, inspection may be performed by manual operation, while in the above-described embodiments, it is performed automatically under the control of the control part 3.

INDUSTRIAL APPLICABILITY

The present invention provides a method and apparatus for inspecting optical modules which can inspect optical modules efficiently in a short time, eliminating waiting time.

The invention claimed is:

1. An inspection board for use in inspecting a plurality of optical modules each having an optical fiber, for at least one of optical characteristics and electrical characteristics thereof, said inspection board comprising:
   a main body having a principal surface;
   a fitting part located on a first region of the principal surface of the main body, for detachably fitting the plurality of optical modules;
   a redundant length handling part located on a second region of the principal surface of the main body, for preventing redundant-length portions of a plurality of optical fibers from being tangled; and
   an array part located on the main body for arranging optical connectors in one direction, each connector being attached to an end of each of the optical fibers, such that light emitting end faces of the optical connectors are exposed and face away from the second region of the principal surface, wherein the redundant length handling part includes a plurality of catching members set up on the main body for individually coiling the redundant-length portions of the optical fibers therearound, and a partition plate having openings through which an upper portion of each of the catching members projects.

2. The inspection board according to claim 1, wherein said partition plate comprises a flat portion facing approximately in parallel to the principal surface of the main body, and a guide portion bent in substantially a semicircular shape in cross section extending continuously from an end of the flat portion adjacent to the fitting part, and wherein the openings are formed in the flat portion.

3. The inspection board according to claim 1, wherein the redundant length handling part includes a cover for covering the catching members and the partition plate.

4. The inspection board according to any one of claims 1, 2 and 3, wherein the fitting part includes a plurality of fitting blocks for individually and detachably fitting the plurality of optical modules, the fitting blocks being arranged in a plurality of rows parallel to the array part such that the fitting blocks in adjacent rows are staggered in position.

5. The inspection board according to claim 4, wherein the fitting blocks in the row farther from the array part are configured to fit the optical modules at an equal to or higher level than the fitting blocks in the rows closer to the array part.

6. An inspection board for use in inspecting a plurality of optical modules each having an optical fiber, for at least one of optical characteristics and electrical characteristics thereof, said inspection board comprising:

a main body having a principal surface;

a fitting part located on a first region of the principal surface of the main body, for detachably fitting the plurality of optical modules;

a redundant-length handling part located on a second region of the principle surface of the main body, for preventing redundant-length portions of a plurality of optical fibers from being tangled; and an array part located on the main body for arranging optical connectors in one direction, each connector being attached to an end of each of the optical fibers, such that light emitting end faces of the optical connectors are exposed and face away from the second region of the principal surface, wherein the fitting part includes a plurality of fitting blocks each having a first opening for fitting one of the optical modules, wherein the main body has a plurality of second openings corresponding to respective ones of the plurality of fitting blocks and formed through the main body from the principal surface to a back surface of the main body, and wherein the fitting blocks are fitted to said fitting part such that the first openings in the fitting blocks each correspond to a second opening in the main body in one to one relation.

7. The inspection board according to claim 6, wherein the redundant-length handling part includes a plurality of catching members set up on the main body for individually coiling the redundant length portions of the optical fibers therearound.

8. The inspection board according to claim 6 or 7, wherein each of the fitting blocks has positioning portions formed near the first opening for fitting a plurality of lead pins of one of the optical module and thereby placing the optical module in right position, and wherein through holes are formed in a part of the positioning portions and the main body, each of the through holes extending from the fitting blocks to the main body.

* * * * *